(12) United States Patent
Magdassi et al.

(10) Patent No.: US 10,895,794 B2
(45) Date of Patent: Jan. 19, 2021

(54) ELECTROCHROMIC DEVICE HAVING A PATTERNED ELECTRODE FREE OF INDIUM TIN OXIDE (ITO)

(71) Applicants: Nanyang Technological University, Singapore (SG); Yissum Research Development Company of the Hebrew University of Jerusalem Ltd, Jerusalem (IL)

(72) Inventors: Shlomo Magdassi, Jerusalem (IL); Pooi See Lee, Singapore (SG); Alexander Kamyshny, Jerusalem (IL); Daniel Mandler, Jerusalem (IL); Peter Darmawan, Singapore (SG); Michael Layani, Jerusalem (IL)

(73) Assignees: NANYANG TECHNOLOGICAL UNIVERSITY, Singapore (SG); YISSUM RESEARCH DEVELOPMENT COMPANY OF THE HEBREW UNIVERSITY OF JERUSALEM LTD, Jerusalem (IL)

(*) Notice: Subject to any disclaimer, the term of this patent is extended or adjusted under 35 U.S.C. 154(b) by 422 days.

(21) Appl. No.: 14/917,750

(22) PCT Filed: Sep. 10, 2014

(86) PCT No.: PCT/SG2014/000426
§ 371 (c)(1),
(2) Date: Mar. 9, 2016

(87) PCT Pub. No.: WO2015/038067
PCT Pub. Date: Mar. 19, 2015

(65) Prior Publication Data
US 2016/0223877 A1    Aug. 4, 2016

Related U.S. Application Data

(60) Provisional application No. 61/875,925, filed on Sep. 10, 2013.

(51) Int. Cl.
*G02F 1/155* (2006.01)
*G02F 1/1503* (2019.01)
*G02F 1/1524* (2019.01)

(52) U.S. Cl.
CPC ............ *G02F 1/155* (2013.01); *G02F 1/1503* (2019.01); *G02F 1/1524* (2019.01); *G02F 2001/1555* (2013.01)

(58) Field of Classification Search
CPC ... G02F 1/155; G02F 1/153; G02F 2001/1555
(Continued)

(56) References Cited

U.S. PATENT DOCUMENTS 4,218,120 A * 8/1980 Kawamura ............. G02F 1/155
396/457
4,768,865 A * 9/1988 Greenberg ............... G02F 1/155
359/266

(Continued)

FOREIGN PATENT DOCUMENTS

WO    WO 2006/072959 A1    7/2006
WO    WO 2013/009200 A1    1/2013

OTHER PUBLICATIONS

Tokuno, Takehiro, et al. "Transparent Electrodes Fabricated via the Self-Assembly of Silver Nanowires Using a Bubble Template." Langmuir, vol. 28, No. 25, 2012, pp. 9298-9302., doi:10.1021/la300961m.*

(Continued)

*Primary Examiner* — Zachary W Wilkes
(74) *Attorney, Agent, or Firm* — Alston & Bird LLP

(57) ABSTRACT

A method of manufacturing an electrochromic device is provided. The method includes providing a patterned arrangement of an electrically conductive material; and applying one or more layers of an electrochromic material to the patterned arrangement, wherein at least a portion of the (Continued)

electrochromic material is in electrical contact with the electrically conductive material. An electrochromic device and an electrochromic ink composition are also provided.

16 Claims, 16 Drawing Sheets

(58) Field of Classification Search
USPC .................................................. 359/266, 271
See application file for complete search history.

(56) References Cited

U.S. PATENT DOCUMENTS

| | | | | |
|---|---|---|---|---|
| 4,772,760 | A * | 9/1988 | Graham | B64C 1/1476 174/389 |
| 4,773,740 | A * | 9/1988 | Kawakami | G02F 1/1525 359/270 |
| 5,066,111 | A * | 11/1991 | Singleton | G02F 1/1525 359/245 |
| 5,124,832 | A * | 6/1992 | Greenberg | G02F 1/1525 359/269 |
| 5,293,546 | A * | 3/1994 | Tadros | G02F 1/155 359/266 |
| 5,940,202 | A * | 8/1999 | Nishikitani | G02F 1/155 359/269 |
| 6,219,173 | B1 * | 4/2001 | Udaka | G02F 1/1506 359/270 |
| 6,936,761 | B2 * | 8/2005 | Pichler | G02F 1/155 136/252 |
| 7,002,722 | B2 * | 2/2006 | Xu | C09K 9/02 359/273 |
| 8,289,607 | B2 * | 10/2012 | Valentin | B32B 17/10376 359/265 |
| 2008/0128287 | A1 | 6/2008 | Wu et al. | |
| 2009/0218310 | A1 | 9/2009 | Zu et al. | |
| 2011/0272176 | A1 | 11/2011 | Goto et al. | |
| 2012/0204950 | A1 | 8/2012 | Magdassi et al. | |
| 2015/0131139 | A1 * | 5/2015 | Tsukamoto | G02B 5/1828 359/266 |

OTHER PUBLICATIONS

Aegerter, C. O. Avellaneda, A. Pawlicka, M. Atik, J. Sol-Gel Sci. Technol. 1997, 8, 689.
Agnihotry, R. Sharma, M. Kar, T. K. Saxena, Sol. Energy Mater. & Sol. Cells 2006, 90, 15.
Berggren, G. A. Niklasson, Solid State Ionics 2003, 165, 51.
Blackman, I. P. Parkin, Chem. Mater. , 2005, 17, 1583.
Calvert, Chem. Mater. 2001, 13, 3299.
Chang, G. Wang, A. Yang, X. Tao, X. Liu, Y. Shen, Z. Zheng, Adv. Funct. Mater. 2010, 20, 2893.
Chen, Y-H. Huang, K-S. Tseng, K-C. Ho, J. New Mater. Electrochem. Syst. 2002, 5, 203.
Costa, C. Pinheiro, I. Henriques, C. A. T. Laia, ACS Appl. Mater. & Interfaces 2012, 4, 1330.
Deepa, A.K. Srivastava, S. N. Sharma, Govind, S. M. Shivaprasad, Appl. Surf. Sci. 2008, 254, 2342.
Filipescu, S. Orlando, V. Russo, A. Lamperti, A. Purice, A. Moldovan, M. Dinescu, Appl. Surf. Sci. 2007, 253, 8258.
Ghosh, DS et al.; "High Figure-of-Merit Ultrathin Metal Transparent Electrodes Incorporating a Conductive Grid"; Applied Physics Letters; vol. 96; 2010; pp. 041109-1 to 041109-3.
Grouchko, A. Kamyshny, C. F. Mihailescu, D. F. Anghel, S. Magdassi, ACS Nano 2011, 5, 3354.
Higashitani, C. E. McNamee, M. Nakayama, Langmuir 2011, 27, 2080.
International Search Report and Written Opinion from International Application No. PCT/SG2014/000426 dated Dec. 23, 2014.
Kamyshny, J. Steinke, S. Magdassi, Open Appl. Phys. J. 2011, 4, 19.
Kamyshny, S. Magdassi, in Inkjet-Based Micromanufacturing (Eds.: J. P. Korvink, P. J. Smith, D.-Y. Shin), Wiley-VCH, Weinheim, Germany 2012, pp. 173-189.
Layani, Grouchko, Shemesh, Magdassi, J. Mater. Chem., 2012, 22, 14349.
Layani, M. Grouchko, O. Millo, I. Balberg, D. Azulay, S. Magdassi, ACS Nano, 2009, 3, 3537.
Layani, S. Magdassi, J. Mater. Chem. 2011, 21, 15378.
Magdassi, M. Grouchko, O. Berezin, A. Kamyshny, ACS Nano 2010, 4, 1943.
Meda, R. C. Breitkopt, T. E. Haas, R.U. Kirss R. U. Thin Solid Films 2002, 402, 126.
Niklasson, C. G. Granqvist, J. Mater. Chem. 2007, 17, 127.
Niklasson, L. Berggren, A-L. Larsson, Sol. Energy Mater. & Sol. Cells 2004, 84, 315.
Ozer, C. M. Lampert, Sol. Energy Mater. & Sol. Cells 1998, 54, 147.
Ozkan S -H. Lee, C. E. Tracy, J. R. Pitts, S. K. Deb, Sol. Energy Mater. & Sol. Cells 2003, 79, 439.
Patna, K. Auddy, D. Ganguli, J. Livage, P. K. Biswas, Mater. Lett. 2004, 58, 1059.
Pauporté, J. Electrochem. Soc. 2002, 149, C539.
Regragui, M. Addou, A. Outzourhit, E. El Idrissi, A. Kachouane, A. Bougrine, Sol. Energy Mater. & Sol. Cells 2004, 77, 341.
Royster, D. Chatterjee, G. R. Paz-Pujalt, C. A. Marrese, Sensors & Actuators 1998, 53, 155.
Saran, K. Parikh, D-S. Suh, E. Muños, H. Kolla, S. K. Manohar, J. Am. Chem. Soc. 2004, 126, 4462.
Seman, C. A. Wolden, Sol. Energy Mater. & Sol. Cells 2004, 82, 517.
Somani, S. Radhakrishnan, Mater. Chem. Phys. 2002, 77, 117.
Thakur, G. Ding, J. Ma, P. S. Lee, X. Lu, Adv. Mater. 2012, 24, 4071.
Vakarelski, D. Y. C. Chan, T. Nonoguchi, H. Shinto, K. Higashitani, Phys. Rev. Lett. 2009, 102, 058303.
Vidotti, S. I. Córdoba de Torresi, J. Braz. Chem. Soc. 2008, 19, 1248.
Wojcik, A. S. Cruz, L. Santos, L. Pereira, R. Martins, E. Fortunato, J. Mater. Chem. 2012, 22, 13268.
Zou, H-L. Yip, S. K. Hau, A. K.-Y. Jen, Appl. Phys. Lett. 2010, 96, 203301.

* cited by examiner

ELECTROCHROMIC DEVICE HAVING A PATTERNED ELECTRODE FREE OF INDIUM TIN OXIDE (ITO)

CROSS-REFERENCE TO RELATED APPLICATION

This application claims the benefit of priority of U.S. provisional application No. 61/875,925 filed on 10 Sep. 2013, the content of which is incorporated herein by reference in its entirety for all purposes.

TECHNICAL-FIELD

The invention relates to electrochromic devices and methods of manufacturing the devices.

BACKGROUND

Research efforts have been directed to study of physicochemical properties of electrochromic materials, as well as materials suitable for use as transparent conductive coatings. There is also interest in manufacturing of electrochromic devices prepared on flexible substrates.

Indium tin oxide (ITO) has traditionally been the preferred choice of transparent conductive coatings. However, transparent electrodes based on ITO have a number of disadvantages, such as high cost of ITO, brittleness of ITO, complexity of manufacturing process involving complicated processes for patterning (mainly by etching), limited quantities of precursors, and low conductivity. In particular, brittleness and high cost of ITO render ITO unsuitable for use in flexible electrochromic devices. Therefore, much effort is directed to finding alternatives for ITO possessing high conductivity, flexibility and yet high transparency that is especially important for large area electrochromic devices such as smart windows.

In view of the above, there remains a need for improved materials and methods for manufacturing electrochromic devices that overcome or at least alleviate one or more of the above-mentioned problems.

SUMMARY

In a first aspect, the invention refers to a method of manufacturing an electrochromic device. The method comprises
  a) providing a patterned arrangement of an electrically conductive material; and
  b) applying one or more layers of an electrochromic material to the patterned arrangement, wherein at least a portion of the electrochromic material is in electrical contact with the electrically conductive material.

In a second aspect, the invention refers to an electrochromic device prepared by a method according to the first aspect.

In a third aspect, the invention refers to an electrochromic device comprising a patterned arrangement of an electrically conductive material in electrical contact with one or more layers of an electrochromic material.

In a fourth aspect, the invention refers to an electrochromic ink composition comprising
  a) about 0.05 wt % to about 60 wt % of an electrochromic material;
  b) about 40 wt % to about 95 wt % of a liquid vehicle;
  c) about 0.01 wt % to about 20 wt % of a physicochemical modifier; and
  d) about 0.01 wt % to about 20 wt % of an additive;
wherein respective wt % are calculated based on total weight of the composition and sum of the respective wt % is 100 wt %.

BRIEF DESCRIPTION OF THE DRAWINGS

The invention will be better understood with reference to the detailed description when considered in conjunction with the non-limiting examples and the accompanying drawings, in which:

FIG. 4B is a 30× magnification of FIG. 4A, and FIG. 4C is a 200× magnification of FIG. 4B. Scale bar in FIG. 4A to C denotes a length of 200 μm, 10 μm, and 1 μm, respectively.

FIGS. 8A and B show optical microscope images of Ag grids: (A) before, and (B) after $WO_3$ patterning. FIG. 8C represents a part of printed $WO_3$ track at low magnification. FIGS. 8D and E show SEM images of the same grids: (D) before, and (E) after $WO_3$ patterning. Scales: FIGS. 8A and 8B—in each square the distance between the lines is 100 μm. Scale bar in FIG. 8C to E denotes a length of 500 μm, 20 μl, and 20 μm, respectively.

DETAILED DESCRIPTION

Figure 1:
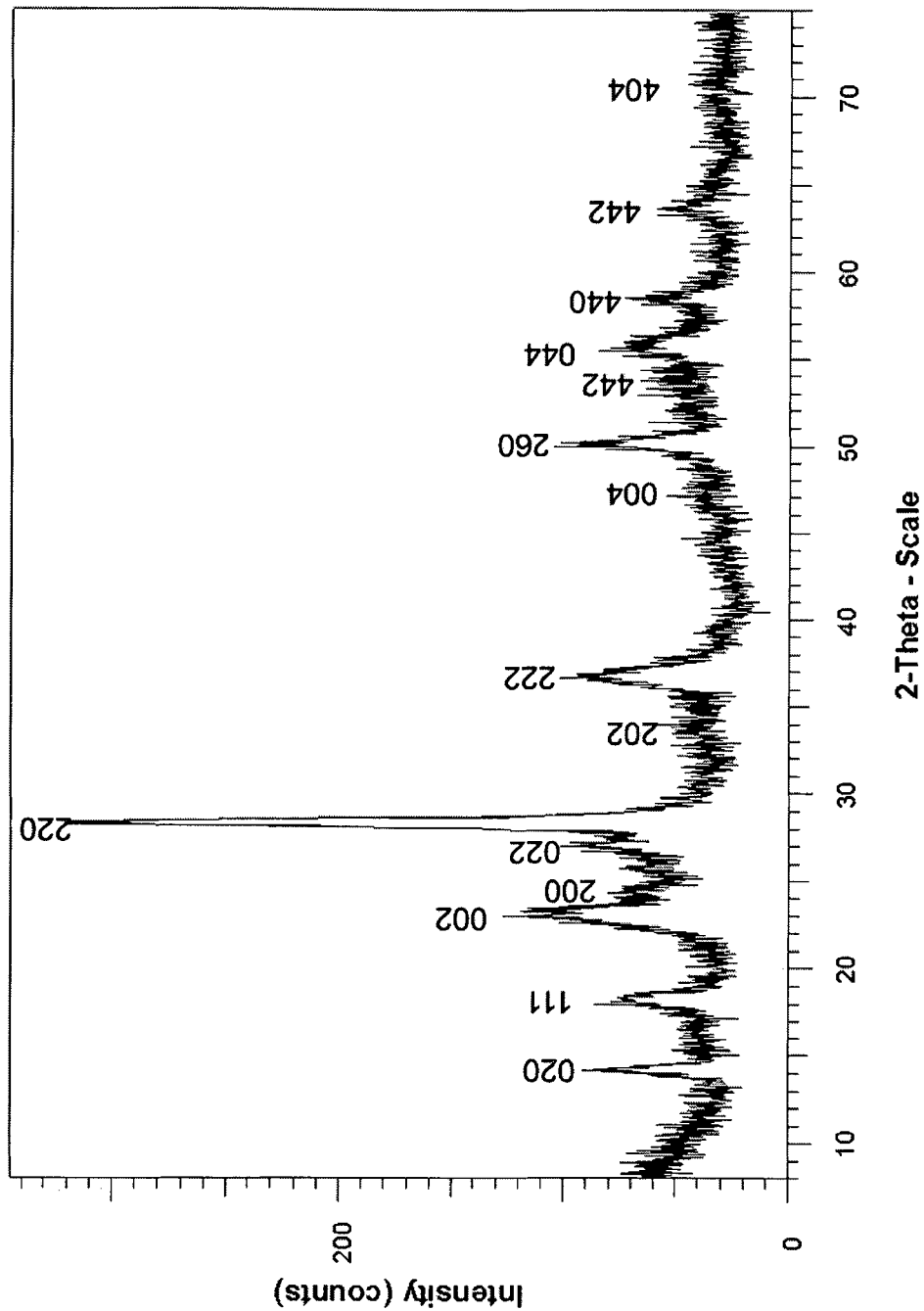
FIG. 1 shows X-ray diffraction (XRD) pattern of synthesized $WO_3$ nanopowder. Peaks are labeled according to the corresponding (hkl) planes.

It has been surprisingly found by the inventors that electrically conductive materials do not need to cover the entire surface occupied by an electrochromic material, to form electrochromic devices. Instead, the electrically conductive material may be present in a patterned arrangement, such as a grid arrangement of lines of the electrically conductive material, on the electrochromic material, with at least a portion of the electrically conductive material in electrical contact with the electrochromic material, to form an electrochromic device. The patterned arrangement of electrically conductive material may be used as a transparent electrode in electrochromic devices. Advantageously, methods disclosed herein allow use of electrically conductive materials which may not themselves be optically transparent, to form the transparent electrode. In so doing, materials for use as transparent electrodes are not limited to indium tin oxide based materials, as non-indium tin oxide materials such as carbon nanotubes, graphene, and metallic nanoparticles may be used instead. By avoiding use of indium tin oxide, problems associated with use of indium tin oxide as set out in the background section may be averted. In addition, by laying out the electrically conductive material in a patterned arrangement, this reduces costs of fabrication, especially in cases where expensive metals such as silver are used as the electrically conductive materials. Further, methods of manufacturing electrochromic devices disclosed herein may be carried out using low cost methods such as inkjet printing, self assembly and tailored screen printing, which allow large scale manufacturing to be carried out in a simple and efficient manner.

It has also been surprisingly found by the inventors that an electrochromic ink composition having a formulation disclosed herein allows a higher loading of the electrochromic material in the electrochromic ink composition. Such an electrochromic ink composition may include an electrochromic material dispersed in a liquid reagent containing a glycol ether. Despite the higher loading of the electrochromic material, the electrochromic ink composition may have a viscosity that is suitable for inkjet printing. Advantageously, a more compact layer of electrochromic material may be formed using the electrochromic ink composition disclosed herein, due to the higher loading of the electrochromic material, which in turn translates into a higher contrast.

With the above in mind, the invention refers in a first aspect to a method of manufacturing an electrochromic device. As used herein, the term "electrochromic device" refers to a device containing a material or compound which changes color upon application of an electric potential.

The method comprises providing a patterned arrangement of an electrically conductive material. Examples of electrically conductive material that may be used include, but are not limited to, a metal, an electrically conductive polymer, carbon nanotubes, graphene, reduced graphene oxide, and combinations thereof.

In various embodiments, the electrically conductive material is free or essentially free of indium tin oxide. By not using indium tin oxide, problems associated with indium tin oxide, such as brittleness and high cost of indium tin oxide, may be avoided.

The electrically conductive material may be an electrically conductive nanostructured material. As used herein, the term "nanostructured material" refers to a material having at least one dimension that is in the nanometer range. Examples of nanostructured material may include nanotubes, nanoflowers, nanowires, nanofibers, nanoflakes, nanoparticles, nanodiscs, nanosheets, and combinations thereof.

At least one dimension of the electrically conductive nanostructured material may be less than 1000 nm. For example, the electrically conductive nanostructured material may have a size ranging from 1 nm to 1000 nm. As the electrically conductive nanostructured material may not be regular in shape and/or be of the same shape, the term "size" as used herein refers to the maximal dimension of the electrically conductive nanostructured material in any direction.

The electrically conductive nanostructured material comprises metallic nanomaterials, such as metallic nanoparticles. In various embodiments, the electrically conductive nanostructured material comprises or consists of metallic nanoparticles. In specific embodiments, the electrically conductive material comprises or consists of silver. For example, the electrically conductive material may comprise or consist of silver nanoparticles.

In various embodiments, providing a patterned arrangement of an electrically conductive material comprises applying the electrically conductive material in a patterned arrangement on a substrate using a method selected from the group consisting of self-assembly, printing, electroless deposition, and combinations thereof. Examples of printing include, but are not limited to, inkjet printing, gravure printing, subtractive printing, transfer printing, contact printing, and laser writing.

The electrically conductive material may be dispersed or suspended in a liquid to form a dispersion prior to its deposition as electrodes. In various embodiments, the electrically conductive material is present in the dispersion in an amount in the range of about 10 wt % to about 30 wt % of the dispersion. For example, the electrically conductive material may be present in an amount in the range of about 10 wt % to about 25 wt %, about 10 wt % to about 20 wt %, about 10 wt % to about 15 wt %, about 12 wt % to about 30 wt %, about 12 wt % to about 16 wt %, or about 12 wt %, about 14 wt % or about 16 wt % of the dispersion. In various embodiments, the electrically conductive material is present in an amount of about 14 wt % of the dispersion.

In specific embodiments, providing a patterned arrangement of an electrically conductive material comprises applying a dispersion comprising the electrically conductive material to a template arranged on a substrate, and forming the patterned arrangement of the electrically conductive material on the substrate by self-assembly.

For example, a patterned template may be positioned or arranged on a substrate. By dispensing or applying a dispersion comprising the electrically conductive material on the patterned template, the dispersion comprising the electrically conductive material may assume the pattern of the patterned template by self-assembly. In so doing, a patterned arrangement of the electrically conductive material may be obtained.

In some embodiments, providing a patterned arrangement of an electrically conductive material may be carried out by contact printing. In such cases, the electrically conductive material may be applied on a template or a mold, with subsequent transfer of the electrically conductive material to a substrate by contacting the template or the mold with the substrate.

In specific embodiments, providing a patterned arrangement of an electrically conductive material is carried out by inkjet printing. Advantageously, inkjet printing as a deposition methodology allows deposition of materials of pre-defined patterns at specific locations. It also allows patterning of electrochromic materials on large area flexible plastic substrates. Using inkjet printing, precise designs of patterned arrangement may be prepared using one-step processing, and involving less expensive and more compact equipment as compared to expensive photolithography methods. Conditions of printing, such as temperature of the substrate and the printhead during printing, may also be controlled easily for printing of large and uniform areas.

As used herein, the term "patterned arrangement" refers to configurations of the electrically conductive material, whereby the electrically conductive material may be placed in a regular array and/or in an irregular pattern. For example, a regular array of the electrically conductive material may refer to the electrically conductive material being arranged orderly or periodically, such as that of a grid arrangement exemplified in the examples, or in the form of electrically connected concentric circles. An irregular pattern of the electrically conductive material may refer to the electrically conductive material arranged in a non-uniform or random fashion, with respective components of the patterned arrangement being electrically connected. The term "electrically connected" refers to the components of the patterned arrangement being arranged such that electrons are able to flow between the electrically conductive material in the patterned arrangement.

The patterned arrangement of the electrically conductive material may be any suitable arrangement that is able to effect a change in color of an electrochromic material placed in electrical contact with the electrically conductive material. For example, the patterned arrangement of the electrically conductive material may comprise or consist of an orderly array of uniform squares, with the electrically conductive material forming lines that define the uniform squares. In various embodiments, the patterned arrangement comprises or consists of a grid, honeycomb, or irregular cells arrangement. As mentioned above, it has been surprisingly found by the inventors that electrochromic devices may be obtained even by using patterned arrangement of electrically conductive material as transparent electrodes, in which the electrically conductive material is not present throughout the entire surface containing or occupied by the electrochromic material. Instead, the electrically conductive material may be present as thin lines on the electrochromic material, with at least a portion of the electrically conductive material in electrical contact with the electrochromic material.

The patterned arrangement of an electrically conductive material may comprise lines of the electrically conductive material surrounding one or more of two-dimensional voids of various shapes. The term "two-dimensional voids" as used herein refer to spaces that are not occupied by the electrically conductive material. The electrically conductive material may form lines that define the various shapes. For example, the one or more of two-dimensional voids of various shapes may be a regular shape such as a square, a rectangle, a circle, a triangle, an ellipse, or a polygon, or an irregular shape.

In various embodiments, the patterned arrangement comprises or consists of a grid arrangement. The patterned arrangement may include lines of the electrically conductive material arranged to form a grid pattern. The lines may have a width of 50 μm or less arranged to form a grid pattern. For example, the patterned arrangement may comprise lines of the electrically conductive material having a width of about 0.5 μm to about 50 μm, such as about 5 μm to about 50 μm, about 15 μM to about 50 μm, about 20 μm to about 50 μm, about 30 μm to about 50 μm, about 0.5 μm to about 40 μm, about 0.5 μm to about 30 μm, about 0.5 μm to about 15 μm, about 5 μm to about 20 μm, about 20 μm to about 40 μm, or about 15 μm to about 35 μm. In specific embodiments, the patterned arrangement comprises lines having a width of about 3 μm to about 4 μm, and therefore the resulting pattern is transparent.

The patterned arrangement of electrically conductive material may be sufficiently thin so as not to affect transparency. In various embodiments, thickness of the electrically conductive material layer may be about 50 nm to about 200 nm, such as about 50 nm to about 150 nm, about 50 nm to about 100 nm, or about 100 nm to about 200 nm.

The method includes applying one or more layers of an electrochromic material to the patterned arrangement, wherein at least a portion of the electrochromic material is in electrical contact with the electrically conductive material. Applying one or more layers of an electrochromic material to the patterned arrangement may include applying one or more layers of an electrochromic material directly on the patterned arrangement.

As mentioned above, the patterned arrangement of an electrically conductive material may function as transparent electrodes in an electrochromic device. The electrochromic material may be placed between two transparent electrodes formed from patterned arrangements of the electrically conductive material. By charging the electrodes, potential of the electrochromic device may be changed to effect a change in color of the electrochromic material.

Examples of electrochromic materials include metal oxide films, molecular dyes, and conducting polymers. In various embodiments, the electrochromic material comprises or consists of an oxide of a metal selected from Group 3 to Group 12 of the Periodic System of Elements. For example, the metal oxide may be an oxide of a transition metal. Examples of transition metal include, but are not limited to, scandium (Sc), titanium (Ti), vanadium (V), chromium (Cr), manganese (Mn), iron (Fe), cobalt (Co), nickel (Ni), copper (Cu), zinc (Zn), and alloys thereof.

In various embodiments, the electrochromic material is selected from the group consisting of $WO_3$, $NiO$, $V_2O_5$, $TiO_2$, $MoO_3$, and combinations thereof. In some embodiments, the electrochromic material comprises or consists of a metal oxide selected from the group consisting of tungsten oxide, nickel oxide, and combinations thereof.

In specific embodiments, the electrochromic material is tungsten oxide. The tungsten oxide may have formula ($WO_3$). Advantageously, tungsten oxide is able to exhibit a fast response and high coloration efficiency, which renders its suitability for use as an electrochromic material. Further, its, color changes from transparent or yellow to deep blue with a large optical modulation when it is reduced under cathodic polarization, to provide a large contrast.

The electrochromic material may be an electrochromic nanostructured material. Examples of nanostructured material have already been discussed above. In various embodiments, the electrochromic nanostructured material comprises nanoparticles and/or nanorods. For example, the electrochromic nanostructured material may comprise or consist of tungsten oxide nanoparticles, tungsten oxide nanorods, nickel oxide nanoparticles, and/or nickel oxide nanorods.

In various embodiments, size of the electrochromic nanostructured material is in the range of about 10 nm to about 200 nm. For example, size of the electrochromic nanostructured material may be, but not limited to, one that is in the range of about 30 nm to about 200 nm, about 60 nm to about 200 nm, about 90 nm to about 200 nm, about 40 nm to about, 150 nm, about 40 nm to about 100 nm, about 60 nm to about 150 nm, about 60 nm to about 100 nm, about 80 nm to about 100 nm, or about 70 nm, about 80 nm, about 90 nm, or about 100 nm. Advantageously, the indicated size range of electrochromic nanostructured material renders the electrochromic nanostructured material suitable for use in an ink composition for inkjet printers, as typical nozzle diameter of inkjet printers are in the range of tens of micrometers.

Size distribution of the electrochromic nanostructured material is not limited, and electrochromic nanostructured material having a wide particle size distribution or a narrow particle size distribution may be used. In some embodiments, the electrochromic nanostructured material is essentially monodisperse, whereby the term "monodisperse" refers to the nanostructured material having at least substantially the same size. In specific embodiments, average size of the electrochromic nanostructured material is about 90 nm.

The one or more layers of an electrochromic material may be a uniform film layer, or be in a second patterned arrangement. In various embodiments, applying one or more layers of an electrochromic material to the patterned arrangement comprises applying one or more layers of an electrochromic material in a second patterned arrangement to the patterned arrangement of an electrically conductive material. The second patterned arrangement of the electrochromic material may be the same as or different from the patterned arrangement of the electrically conductive material. For example, the second patterned arrangement of electrochromic material may be in the form of an image, one or more lines, one or more shapes, one or more letters, words, or a motif, to name only a few.

The patterned arrangement of an electrically conductive material may overlap with about 5% to about 50% by area of the electrochromic material. In various embodiments, the patterned arrangement of an electrically conductive material overlaps with about 5% to about 90% by area of the electrochromic material, such as about 5% to about 20%, about 5% to about 15%, about 5% to about 10%, about 10% to about 40%, about 15% to about 40%, about 20% to about 40%, about 15% to about 30%, about 10% to about 30%, or about 15% to about 35% by area of the electrochromic material. In some embodiments, the patterned arrangement of an electrically conductive material overlaps with about 5% to about 50% by area of the electrochromic material. In specific embodiments, the patterned arrangement overlaps with about 5% to about 15% by area of the electrochromic material.

Applying one or more layers of an electrochromic material may be carried out by a suitable thin film deposition method, such as inkjet printing, thermal evaporation, laser ablation, spray coating, dip coating, sputtering, chemical vapor deposition (CVD), metal-organic deposition technique with the use of suitable tungsten-organic compounds, spray pyrolysis, electrodeposition, and sol-gel technique.

In various embodiments, applying one or more layers of an electrochromic material to the patterned arrangement is carried out by inkjet printing. The inkjet printing may be carried out using an electrochromic ink composition comprising the electrochromic material. As mentioned above, inkjet printing as a deposition methodology allows deposition of materials pre-defined patterns at specific locations. It involves less expensive equipment, thus rendering it a much cheaper alternative to expensive photolithography methods. Advantageously, using this methodology, a Red-Green-Blue (RGB) pixel cell electrochromic material deposition for electrochromic matrix display may be carried out. The technique may also be applied on both rigid and flexible substrates. In embodiments where one or more layers of an electrochromic material is applied in a second patterned arrangement, the second patterned arrangement may also be carried out by printing, such as inkjet printing. Examples of other printing methods have already been discussed above.

In various embodiments, applying one or more layers of an electrochromic material on the patterned arrangement is repeated one or more times to form multilayers of the electrochromic material on the patterned arrangement. Number of layers formed may be tailored according to intended properties of the electrochromic device. For example, applying one or more layers of an electrochromic material on the patterned arrangement may be repeated one or more times to form 2, 3, 4, 5, 6, 7, 8, 9, 10, 11, 12, 13, 14, or more layers of the electrochromic material on the patterned arrangement.

Applying one or more layers of an electrochromic material to the patterned arrangement may include providing one or more layers of an electrochromic material and applying the patterned arrangement of an electrically conductive material to the one or more layers of an electrochromic material.

The patterned arrangement of an electrically conductive material or the one or more layers of an electrochromic material may be deposited on a substrate. The substrate may be a rigid substrate or a flexible substrate. In various embodiments, the substrate is a flexible substrate. In some embodiments, the substrate is selected from the group consisting of glass, polycarbonate, polyethylene terephthalate, polyethylene naphthalate, polyimide, polydimethylsiloxane, and combinations thereof. In specific embodiments, the substrate is polyethylene terephthalate.

Before applying either of the electrically conductive material or the electrochromic material on the substrate, the substrate may be subjected to a pre-treatment, for example, using oxygen plasma or UV-light irradiation. The pre-treatment may include immersing the substrate into a wetting agent solution, such as BYK 348 and/or BYK 333, for a suitable time duration in the range of about five minutes to about ten minutes, prior to wiping dry with a cleanroom or polyester wipe, or blow dry.

Providing a patterned arrangement of an electrically conductive material may include further sintering of the conductive patterned arrangement, such as by heat treatment, photonic sintering and chemical sintering. Sintering may be carried out to form a continuous conductive pattern for electricity flow in the electrically conductive material, particularly in case the electrically conductive material comprises nanostructured materials. In various embodiments, providing a patterned arrangement of an electrically conductive material comprises chemically sintering the electrically conductive material in the patterned arrangement. Advantageously, by chemically sintering the patterned arrangement of the electrically conductive material, the electrically conductive material may coalesce to form a more compact layer of the electrically conductive material. This may in turn translate into improved stability to bending of the electrically conductive material. The chemical sintering may be carried out by contacting the electrically conductive material with an acid. In specific embodiments, the acid comprises or consists of hydrochloric acid.

The invention refers in further aspects to an electrochromic device prepared by a method according to the first aspect, and to an electrochromic device comprising a patterned arrangement of an electrically conductive material in electrical contact with one or more layers of an electrochromic material. Examples of suitable electrically conductive material and electrochromic material have already been discussed above.

Advantageously, it has been demonstrated herein in embodiments that electrically conductive material, such as silver nanoparticles, arranged in a grid arrangement on a polymeric substrate are able to be used in place of indium tin oxide as transparent electrodes in electrochromic devices. The obtained electrodes have demonstrated high transparency, such as 83% in the spectral range of 400 nm to 800 nm, low sheet resistance in the range of 1 to 5Ω/☐, and high stability to multiple bending. Upon application of an electrochromic material onto the transparent electrode, the obtained flexible electrochromic films are able to maintain their coloring and bleaching performance during bending of the flexible films upon application of an alternating potential, to achieve a high contrast of 72% at 633 nm.

In various embodiments, the electrically conductive material comprises or consists of a metal, an electrically conductive polymer, carbon nanotubes, graphene, reduced graphene oxide, and combinations thereof. The electrically conductive material may be free or essentially free of indium tin oxide.

The electrically conductive material may be an electrically conductive nanostructured material. In specific embodiments, the electrically conductive nanostructured material comprises or consists of metallic nanoparticles. For example, the electrically conductive nanostructured material may comprise or consist of silver nanoparticles.

The patterned arrangement of an electrically conductive material may directly contact the one or more layers of an electrochromic material. As mentioned above, the patterned arrangement of an electrically conductive material may be a regular and/or an irregular arrangement that is able to effect a change in color of an electrochromic material placed in contact with the electrically conductive material. The patterned arrangement may vary depending on the type of electrically conductive material used, so as to maintain transparency of the electrical conductive material in use, for example, as a transparent electrode in an electrochromic device. As mentioned above, transparent electrodes having a high transparency of 83% in the spectral range of 400 nm to 800 nm have been obtained using a grid arrangement of silver nanoparticles having line width of 3 μm to 4 μm.

The patterned arrangement of electrically conductive material may be an ordered array of the electrically conductive material. The patterned arrangement of an electrically conductive material may include lines of the electrically conductive material surrounding one or more of two-dimensional voids of various shapes. In various embodiments, the patterned arrangement of electrically conductive material comprises or consists of a grid arrangement. The patterned arrangement may include lines of the electrically conductive material arranged to form a grid pattern. The lines may have a width of 50 μm or less arranged to form a grid pattern. In specific embodiments, the patterned arrangement comprises lines of the electrically conductive material having a width of about 3 μm to about 4 μm, and therefore the resulting pattern is transparent.

As the electrically conductive material is present in the form of a patterned arrangement in electrical contact with the one or more layers of electrochromic material, the electrically conductive material does not overlap fully with the electrochromic material. As mentioned above, this reduces costs of fabrication, especially in case where expensive metals such as silver are used as the electrically conductive materials.

In addition to the electrically conductive material being present as a patterned arrangement in the electrochromic device, the one or more layers of an electrochromic material may be in a second patterned arrangement in the electrochromic device. The second patterned arrangement of the electrochromic material may be the same as or different from the patterned arrangement of the electrically conductive material. Examples of patterned arrangements of the electrochromic material have already been discussed above.

In various embodiments, the patterned arrangement of an electrically conductive material overlaps with about 5% to about 90% by area of the electrochromic material. In some embodiments, the patterned arrangement of an electrically conductive material overlaps with about 5% to about 50% by area of the electrochromic material. In specific embodiments, the patterned arrangement overlaps with about 5% to about 15% by area of the electrochromic material.

The patterned arrangement of an electrically conductive material or the one or more layers of an electrochromic material may be deposited on a substrate. Examples of suitable substrates have already been mentioned above.

Apart from the electrically conductive material, the electrochromic material and/or the substrate, the electrochromic device may include an electrolyte layer. Suitable electrolytes include an aqueous electrolyte, a polymer gel electrolyte, a semi-solid electrolyte, or a dry solid electrolyte that is compatible with the substrate and electrochromic material layer.

The polymer gel electrolyte may contain a polymer matrix such as, but not limited to, poly(methyl methacrylate), polyvinyl butyral, polyvinyl alcohol, a fluoropolymer, polyethylene oxide, and combinations thereof.

A lithium salt may be comprised in the electrolyte of the electrochromic device, and may be selected from the group consisting of $LiClO_4$, $LiBr$, $LiI$, $LiCl$, $LiSCN$, $LiCF_3SO_3$, $LiBF_4$, $LiAsF_6$, and combinations thereof. Other non Li based electrolytes, for example gel electrolytes such as methacrylate based gel polymer electrolytes, may also be used.

Solvents such as, but not limited to, ethylene carbonate, propylene carbonate, dimethyl formamide, diethyle phthalate, diethyl carbonate and plasticizer solvents, may be included in the electrolyte.

In a further aspect, an electrochromic ink composition is provided. As used herein, the term "electrochromic ink composition" refers to a liquid comprising a material or compound which changes color upon application of an electric potential.

The electrochromic ink composition comprises about 0.05 wt % to about 60 wt % of an electrochromic material; about 40 wt % to about 95 wt % of a liquid vehicle; about 0.01 wt % to about 20 wt % of a physicochemical modifier; and about 0.01 wt % to about 20 wt % of an additive; wherein respective wt % are calculated based on total weight of the composition and sum of the respective wt % is 100 wt %. Suitable electrochromic materials that may be used have already been discussed above.

The electrochromic ink composition comprises about 0.05 wt % to about 60 wt % of an electrochromic material. For example, the electrochromic ink composition may contain about 0.05 wt % to about 40 wt %, about 0.05 wt % to about 30 wt %, about 0.05 wt % to about 20 wt %, about 0.05 wt % to about 5 wt %, about 10 wt % to about 60 wt %, about 20 wt % to about 60 wt %, about 30 wt % to about 60 wt %, about 40 wt % to about 60 wt %, about 10 wt % to about 20 wt %, about 1 wt % to about 5 wt %, or about 3 wt % to about 8 wt % of an electrochromic material.

In various embodiments, the electrochromic material is selected from the group consisting of $WO_3$, $NiO$, $V_2O_5$, $TiO_2$, $MoO_3$, and combinations thereof.

In some embodiments, the electrochromic material is an electrochromic nanostructured material. For example, the electrochromic nanostructured material may include nanoparticles and/or nanorods, such as tungsten oxide nanoparticles, tungsten oxide nanorods, nickel oxide nanoparticles, and/or nickel oxide nanorods. Size of the electrochromic nanostructured material may be in the range of about 40 nm to about 200 nm. As mentioned above, the indicated size range of electrochromic nanostructured material renders the electrochromic nanostructured material suitable for use in an ink composition for inkjet printers. In various embodiments, the electrochromic ink composition is adapted for inkjet printing.

The electrochromic material may be dissolved in the liquid vehicle to form a solution or be suspended therein to form a dispersion. The liquid vehicle constitutes about 40 wt % to about 95 wt % of the electrochromic ink composition, such as about 50 wt % to about 95 wt %, about 60 wt % to about 95 wt %, about 70 wt % to about 95 wt %, about 40 wt % to about 85 wt %, about 40 wt % to about 75 wt %, about 40 wt % to about 60 wt %, about 50 wt % to about 80 wt %, or about 50 wt % to about 75 wt %.

The liquid vehicle may be an aqueous solution such as water, or an organic solvent, such as diethylene glycol n-butyl ether and their combination thereof. In various embodiments, the liquid vehicle comprises a glycol ether. A more compact layer of electrochromic material may be formed using the electrochromic ink composition disclosed herein, due to the higher loading of the electrochromic material, which in turn translates into a higher contrast.

The liquid vehicle may be selected from the group consisting of ethylene glycol, diethylene glycol, diethylene glycol n-butyl ether, diethylene glycol n-butyl ether acetate, diethylene glycol ethyl ether, diethylene glycol ethyl ether acetate, diethylene glycol methyl ether, dipropylene glycol butyl ether, dipropylene glycol methyl ether, dipropylene glycol methyl ether acetate, ethylene glycol dibutyrate, and combinations thereof.

Apart from glycol ether, the liquid vehicle may further contain an aqueous solution such as water, and/or an alcohol. For example, the liquid vehicle may further comprise a liquid selected from the group consisting of an aqueous solution, water, ethanol, isopropyl alcohol, ethylene glycol, propylene glycol, n methyl pyrrolidone, terpinol, dipropylene glycol methyl ether (DPM), dipropylene glycol methyl ether acetate (DPMA), and combinations thereof.

In some embodiments, the liquid vehicle is a mixture of water and diethylene glycol n-butyl ether. Water and diethylene glycol n-butyl ether may be present in any suitable amount depending on the components in the electrochromic ink composition and specific viscosity requirements of the electrochromic ink composition, for example. In specific embodiments, ratio of water to diethylene glycol n-butyl ether in the liquid vehicle is about 1:1, by weight.

In addition to the electrochromic material and the liquid vehicle, the electrochromic ink composition comprises about 0.01 wt % to about 20 wt % of a physicochemical modifier. As used herein, the term "physicochemical modifier" refers to a compound that is used to change or affect physical, structural and/or chemical property of a material. Examples of a physicochemical modifier include a surfactant, a polymer, a co-solvent, a viscosity modifier, a surface tension modifier, or an evaporation rate control agent. One or more of the aforementioned physicochemical modifiers may be used to affect physical, structural, and/or chemical property of the electrochromic ink composition.

For large area printing, the electrochromic ink composition may be formulated to have suitable physicochemical properties, such that it is suitable for use in printing and coatings equipments, for example. Physicochemical properties that may be controlled include, but are not limited to, surface tension, viscosity and evaporation rate. In applications which involve use of an inkjet printer for example, controlling of the physicochemical properties is important to enable jetting or dispensing of the ink out from print-head nozzles, while at the same time, provide a uniform printed pattern on the substrate.

In various embodiments, the physicochemical modifier comprises a viscosity modifier. The viscosity modifier may be used to affect or change flowability of the electrochromic ink composition. In specific embodiments, the viscosity modifier is selected from the group consisting liquids or polymers, such as ethylene glycol, ethanol, polyethylene glycol, polyvinyl pyrrolidone (PVP), polyvinyl alcohol (PVA), polyvinylbutyral (PVB), polyvinyl alcohol, polyvinyl acetate (EVA), terpinol, Dowanol PPH, propylene glycol momo methyl ether acetate, and combinations thereof.

In some embodiments, the physicochemical modifier comprises a surface tension modifier. The surface tension modifier may be added to affect or change printing performance and wetting behavior of the electrochromic ink composition. In specific embodiments, the surface tension modifier is selected from the group consisting of Tegowet, triton X100, BYK 348, BYK 333, BYK 349, and combinations thereof. Other surface tension modifiers may be used as well. In addition to or apart from use of a surface tension modifier, surface tension of the electrochromic ink composition may also be modified or controlled by choice of liquid vehicle comprised in the electrochromic ink composition.

The electrochromic ink composition also contains about 0.01 wt % to about 20 wt % of an additive. The additive may be selected from the group consisting of a binder (such as polyvinyl pyrrolidone (PVP), polyvinyl alcohol (PVA), polyvinylbutyral (PVB), or polyvinyl acetate (EVA), a pH control agent (such as an acid, a base, or a buffer solution), an antimicrobial agent (such as propyl paraben), and combinations thereof.

As mentioned above, the electrochromic ink composition comprises about 0.05 wt % to about 60 wt % of an electrochromic material. In various embodiments, the electrochromic material is present in an amount of at least 5 wt % of the electrochromic ink composition. Advantageously, the electrochromic ink composition disclosed herein is able to contain a higher amount of electrochromic material due to proper formulation of components in the liquid vehicle. This may result in formation of more compact layers of electrochromic material, translating in higher contrast values of electrochromic devices.

The electrochromic ink composition and electrochromic device disclosed herein may be used in displays, smart windows, and mirrors. By applying an electric field with polarization to the patterned arrangement of an electrically conductive material, color of the one or more layers of electrochromic material may be varied. For example, when the electrochromic material is tungsten oxide, applying of an electric field with negative polarization to the patterned arrangement of an electrically conductive material may change the color of the electrochromic device from transparent to deep blue. Other colors may also be obtained, depending on the active electrochromic materials used. The colors may be continuous such as that used in smart windows, or patterned such as used in displays.

Hereinafter, the present invention will be described more fully with reference to the accompanying drawings, in which exemplary embodiments of the invention are shown. This invention may, however, be embodied in many different forms and should not be construed as limited to the exemplary embodiments set forth herein. Rather, these embodiments are provided so that this disclosure will be thorough and complete, and will fully convey the scope of the invention to those skilled in the art. In the drawings, lengths and sizes of layers and regions may be exaggerated for clarity.

As used herein, the term "and/or" includes any and all combinations of one or more of the associated listed items. The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The invention illustratively described herein may suitably be practiced in the absence of any element or elements, limitation or limitations, not specifically disclosed herein. Thus, for example, the terms "comprising", "including", "containing", etc. shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the inventions embodied therein herein disclosed may be resorted to by those skilled in the art, and that such modifications and variations are considered to be within the scope of this invention.

The invention has been described broadly and generically herein. Each of the narrower species and subgeneric groupings falling within the generic disclosure also form part of the invention. This includes the generic description of the invention with a proviso or negative limitation removing any subject matter from the genus, regardless of whether or not the excised material is specifically recited herein.

Other embodiments are within the following claims and non-limiting examples. In addition, where features or aspects of the invention are described in terms of Markush groups, those skilled in the art will recognize that the invention is also thereby described in terms of any individual member or subgroup of members of the Markush group.

EXPERIMENTAL SECTION

The following describes as non-limiting examples, one of the approaches to fabricate the electrochromic (EC) films and devices, which is based on inkjet printing dispersions of tungsten oxide ($WO_3$) nanoparticles, onto transparent electrodes made by self assembly of silver (Ag) nanoparticles into transparent grids.

As demonstrated herein, a method for the fabrication of electrochromic films according to an embodiment is presented. The method comprises inkjet printing of a dispersion of $WO_3$ nanoparticles onto transparent, flexible metal grid electrodes formed by metallic nanoparticles. The metal grid electrodes comprising metallic nanoparticles are self-assembled, and sintered into periodic uniform squares on a plastic substrate or PET. The transparent, flexible metal grid electrodes comprise a non-ITO electrical conducting material.

It was surprisingly found that electrochromic devices may be obtained even by using transparent electrodes, in which the conductive material is not present throughout the whole surface, but is present as thin lines which surround 2D voids or empty cells (i.e. the voids or the cells do not contain a conductive material) without electrically conductive materials, while bringing good EC performance which is suitable for industrial applications. This finding enables low cost fabrication of large area of both rigid and flexible EC devices, including patterning of the EC materials. As disclosed herein, the metallic conductive structures may have a transparency above 70% and a sheet resistance below 600 ohms per square.

Example 1

Materials and Methods

Example 1.1

Reagents

All reagents were of analytical grade, and were used without additional purification.

Example 1.2

$WO_3$ Ink Preparation and Printing

Tungsten oxide nanoparticles were synthesized by a sol-gel method. Generally, metallic tungsten was added to hydrogen peroxide (6.8% (w/w) of metallic tungsten in hydrogen peroxide) and allowed to react for about 3 min until a clear transparent colorless solution was formed. This solution was heated at 100° C. under stirring in a closed vessel, until a yellow solution is obtained after 2 h.

The final product (pale yellow dispersion) was lyophilized. The yellow powder obtained was used for ink formulation. Stable inks with $WO_3$ concentration of 0.5 wt % and 5 wt % were obtained by vigorous stirring of the lyophilized $WO_3$ powder in 1:1 mixture of water and diethylene glycol n-butyl ether (DOWANOL DB) without sonication, and with heating, filtration, and addition of dispersing agents.

A non-limiting example of $WO_3$ inkjet ink for large area printing EC device is provided in TABLE 1:

TABLE 1

Example of $WO_3$ inkjet ink

| Materials | Amount (weight %) | Remarks |
|---|---|---|
| $WO_3$ Nanoparticles | 10% | Base EC material |
| Ethylene Glycol | 20% | Liquid vehicle and viscosity modifier |
| Diluted BYK 348 & 333 (10 wt. % solution in triple distilled water) | 70% | Liquid vehicle Surface tension modifier |

X-ray diffraction (XRD) measurements of the powder were made on a powder X-ray diffractometer D8 Advance of Broker AXS.

Surface tension of inks was determined by pendant drop technique using FTA 100 tensiometer of First Ten Angstroms, and viscosity was determined using Brookfield DV-II+ viscometer.

Size distribution of $WO_3$ particles in inks was measured on a Zetasizer Nano-ZS of Malvern Instruments).

Printing was performed by an OmniJet 100 printer (Unijet, Korea) with 30 pL piezoelectric printhead (Samsung, Korea). The number of printed layers varied from 1 to 10.

Printing the formulated $WO_3$ inks on flexible substrates, such as polyethylene terphthalate (PET), polyethylene naphthalate (PEN), polyimide, and PDMS, are suitable to fabricate flexible electrochromic (EC) devices.

Example 1.3

Fabrication of Transparent Silver Grids

Dispersions of silver (Ag) nanoparticles (42 wt %) with an average size of 14±3 nm and a zeta potential of −42 mV stabilized by polyacrylic acid sodium salt (MW 8 kD), were synthesized.

In general, silver nanoparticles were prepared by chemical reduction of silver ions, in presence of a suitable dispersing agent, such as that described in WO 2006072959.

Transparent silver grids were fabricated by placing droplets, which range in volume from 10 µL to 2004 and contain a 2 wt % to 20 wt % dispersion of silver NP, on top of a screen printing mesh. The mesh was placed on top of the substrate (plastic or glass, rigid or flexible). Prior to this, the mesh and substrate were properly hydrophilized, which may be carried out by chemical treatment or by physical treatment such as plasma. Once the droplet reached the mesh, it immediately wet the surface, and filled the gap between the mesh and the substrate. During evaporation of the solvent (typically water but may also be obtained with organic solvents), the particles rearranged according to the wires of the mesh, with a line width of about 10% of the line width of the wires of the mesh. Stainless steel mesh with openings of 40 µm and mesh diameter of 16 µm (Micron, Germany) was used in the study.

Chemical sintering of the grids was performed at room temperature by exposing the poly(ethylene terephthalate) (PET) with deposited Ag grid pattern to hydrochloric acid (HCl) vapors for 10 seconds. Sheet resistance of silver grids was measured by a four-pin probe surface resistivity meter (Cascade Microtech Inc).

Even though silver nanoparticles that were self-assembled in grid form are disclosed herein, the base transparent conducting electrode (TCE) is not limited to this and may include other non-ITO TCEs, such as assembled silver nanoparticles in thin lines surrounding 2D voids ("cells") in various shapes, silver-rings, carbon nanotubes networks, graphene/reduced graphene oxides on glass/PET substrates, hybrid TCE such as grid coated with PEDOT:PSS, CNT continuous film, and grid. Furthermore, the grids may vary in the "open area" dimensions from 5% to 90%, depending on the transparency and sheet resistance that is required. The term "conductive grid" as used herein includes all structures which are composed of voids surrounded by thin lines on the conductive materials.

Example 1.4

Characterization of Silver Grids

Morphology of silver grids before and after $WO_3$ printing was examined using a scanning electron microscope (Tecnai F20, FEI Company).

For flexibility tests, Ag electrodes were cut into two rectangular pieces with length of 5 cm and width of 1 cm. Tests were performed using Instron Tester 5567. Load cell with 500 N was used. During the flexibility test, Ag electrode was subjected to 30% of compression for 50 cycles at rate of 10%/sec.

Example 1.5

Electrochromic Tests

Electrochromic tests were performed in a three-electrode compartment, with the test sample connected as working electrode, a Ag wire as a reference electrode, and a Pt wire as a counter electrode. All the three electrodes were placed in a glass cuvette. Electric potential of the sample was controlled by potentiostat (Solartron 1470E, UK).

Transmittance of the films was measured with a UV-Vis-NIR spectrophotometer UV-3600 (Shimadzu, Japan).

Cyclic coloring-bleaching test was carried out by applying −0.9 V (vs. Ag) for coloring and 0.3 V (vs. Ag) for bleaching. Each coloring or bleaching segment was 120 sec. The electrolyte was 1 M $LiClO_4$ in propylene carbonate (PC). The test was performed at room temperature (about 25° C.).

Transparency measurements were performed by placing the electrochromic film (strips 1 cm width) with attached electrode in a quartz cuvette containing the same electrolyte of 1 M $LiClO_4$ in propylene carbonate (PC) and counter electrode (Pt wire).

Bending tests were performed as follows. Sample with $WO_3$ (5 wt %) printed onto Ag grid was bended to 180° angle, 100 times inside a glass vial filled with $LiClO_4$ electrolyte. Bleaching-coloring cycles were performed while applying −0.9 V or −1.2 V for coloration and +0.3 V for bleaching.

Example 2

Results and Discussion

Example 2.1

$WO_3$ Inks

FIG. 1 shows X-ray diffraction (XRD) spectra of the synthesized $WO_3$ nanoparticles with its peaks labeled according to the corresponding (hkl) planes.

According to the XRD pattern shown in FIG. 1, the lyophilized $WO_3$ nanopowder, which was synthesized by sol-gel method, was characterized by peaks consistent with a mixture of orthorhombic $WO_3 \cdot 0.33H_2O$ (89.2%, PDF number 01-072-0199) and $WO_3 \cdot H_2O$ (10.8%, PDF number 04-011-6930) with Scherrer crystallite sizes 15.32 and 9.39 nm, respectively.

This powder was used for ink preparation without any additional treatment. The powder was dispersed in 1:1 (wt/wt) mixture of water and diethyleneglycol n-butyl ether at concentrations 0.5 wt % or 5 wt % by vortex stirring for 1 minute. Even at a concentration of 5 wt %, the ink was stable at ambient conditions for several months without particles aggregation and sedimentation, and also displayed good printability.

Figure 2:
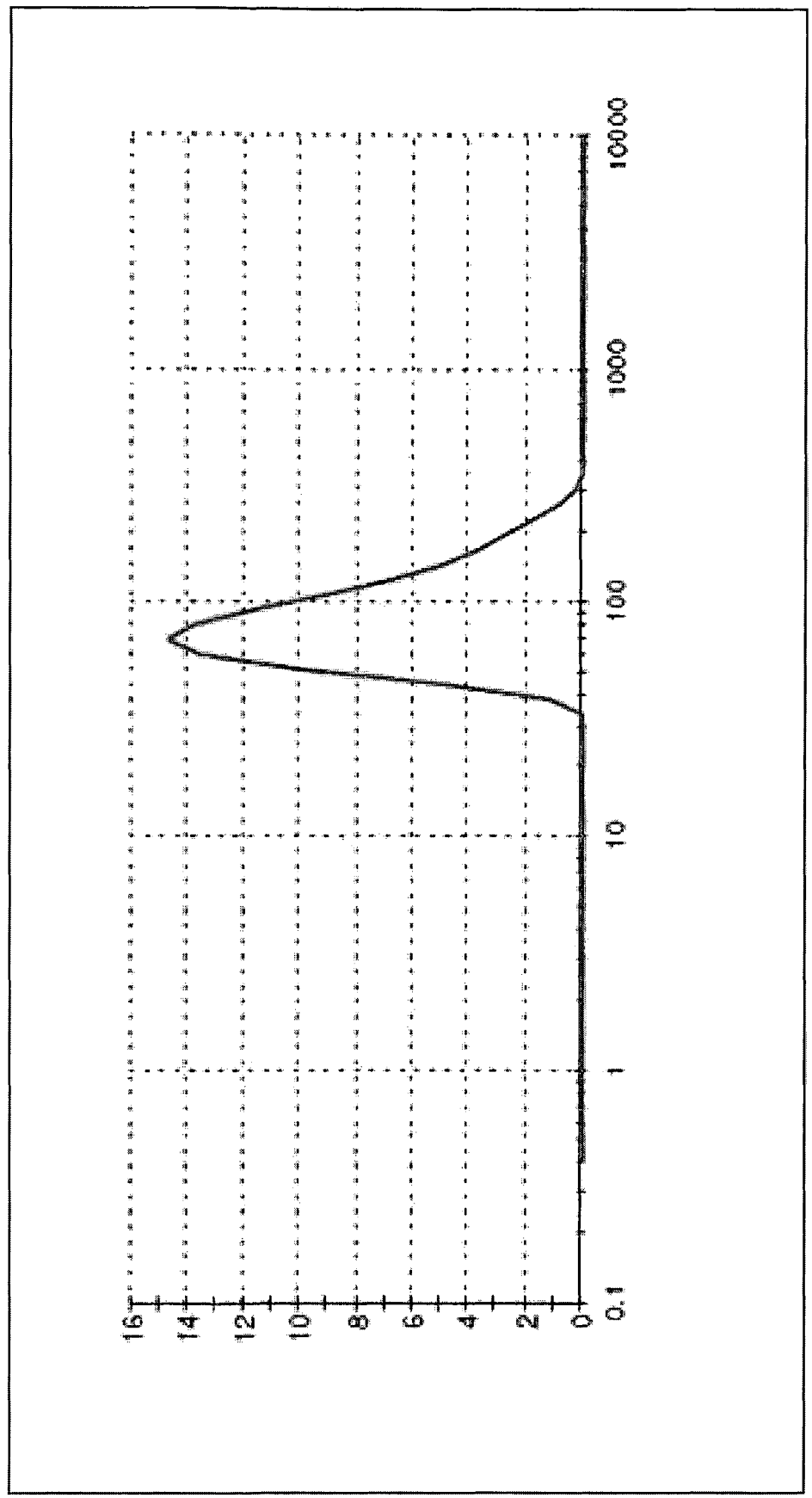
FIG. 2 is a graph showing distribution of $WO_3$ particle size in inkjet ink formulation according to dynamic light scattering (volume distribution).
Figure 3:
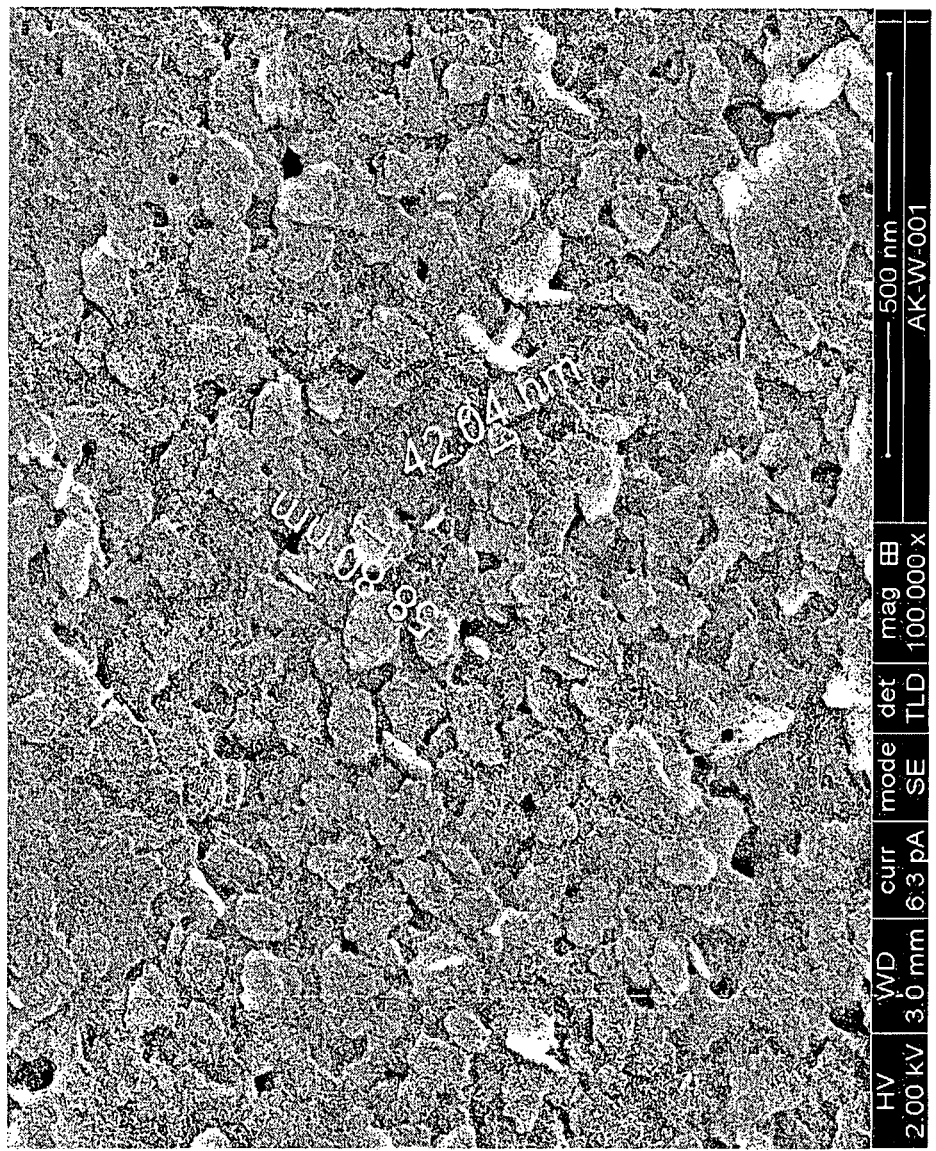
FIG. 3 is a scanning electron microscopy (SEM) image of $WO_3$ particles in inks. Numbers in the figure denote 58.80 nm and 42.04 nm respectively. Scale bar in the figure represents a length of 500 nm.

According to dynamic light scattering measurements, average size (by volume distribution) of the $WO_3$ particles in the ink formulations was about 90 nm (FIG. 2). This data correlated well with the SEM results: size of $WO_3$ particles in ink is in the range of 40 nm to about 170 nm (FIG. 3). The much larger size compared to nanopowder crystallites, indicates that the $WO_3$ particles in the ink are polycrystalline aggregates of the original primary nanoparticles. It should be noted that this range of particles size is suitable for inkjet printers, in which the typical nozzle diameter is in the range of tens of micrometers.

Important parameters for optimal inkjet printing performance are the ink viscosity and surface tension. While using printers with drop-on-demand printheads, viscosity should be in the range of 3 cP to 15 cP, and surface tension in the range of 25 mN/m to 35 mN/m. These parameters were measured for inks with $WO_3$ content of 0.5 wt % and 5 wt %. Viscosity was determined to be 5.2 cP and 6.5 cP, respectively, while surface tension was determined to be 31 mN/m and 32 mN/m, respectively. Both viscosity and surface tension values indicate that the $WO_3$ inks are well suitable for inkjet printing.

Example 2.2

Silver Grids

A major component of flexible electrochromic devices is the working electrode. Presently, transparent electrodes based on indium tin oxide (ITO) are mainly used. Main disadvantages of such electrodes are their rigidity, complexity and high cost of the manufacturing process.

In the present work, transparent flexible electrodes composed of silver grids, which were formed by self-assembled silver nanoparticles on a plastic substrate, PET, and sintered at room temperature were demonstrated for the first time.

Figure 4:
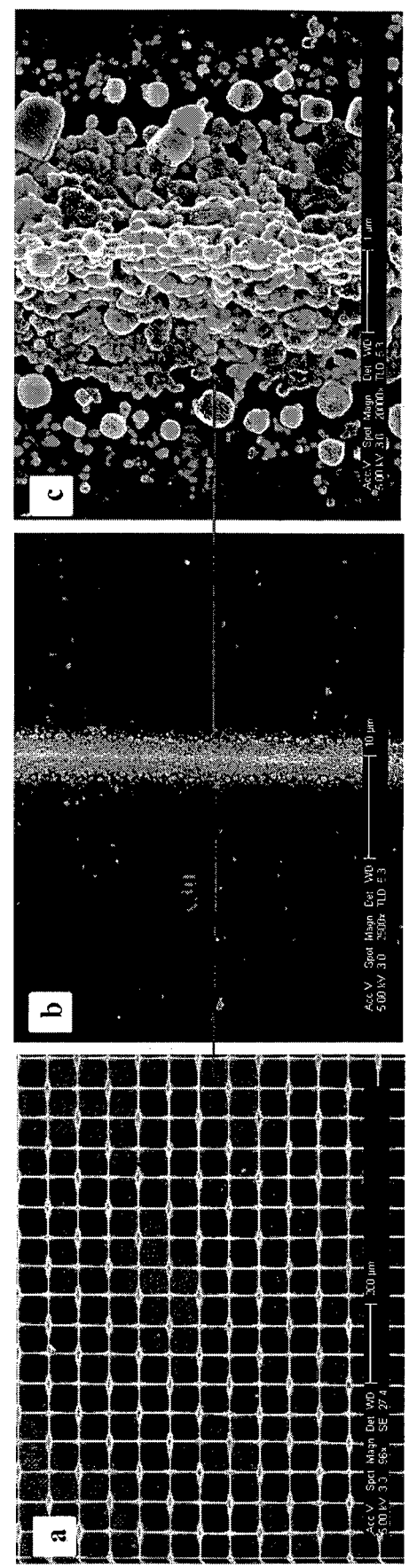
FIG. 4A to C show SEM images of Ag grids on PET with different magnifications, where

As seen in the SEM images, the fabricated grids consist of fairly uniform squares, with a side length of 75 μm (FIG. 4A) and track width of 3 μm to 4 μm (FIG. 4B) formed by tightly packed and welded silver nanoparticles.

Resistivity and transparency constitute the most important characteristics of grids for use as transparent electrodes. These parameters were optimized as discussed below.

Figure 5:
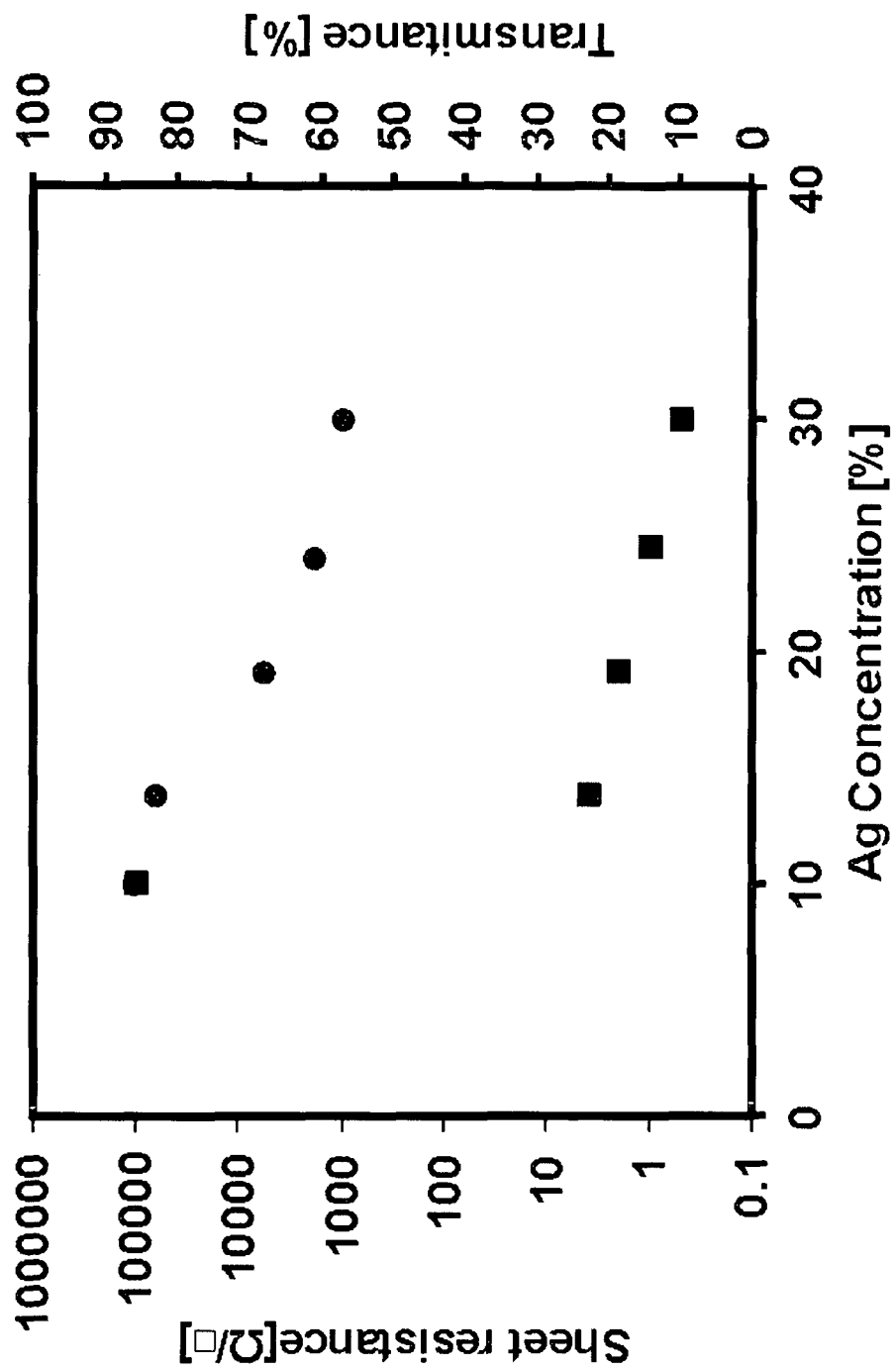
FIG. 5 is a graph showing sheet resistance (Ω/□) and average transparency (%) in the spectral range of 350 nm to 900 nm as a function of metal loading in Ag dispersion used for grids fabrication.

For preparation of silver grids, dispersions of silver nanoparticles with various metal loadings were used. As seen in FIG. 5, sheet resistance of the grids fell by about 5 orders of magnitude from $100000\Omega/\square$ to a range of about $1\Omega/\square$ to $5\Omega/\square$, when metal loading in silver dispersion was increased from 10% to 14%. With further increase in the metal loading, the sheet resistance then decreased gradually.

It was postulated that metal loading in the silver dispersion used for the grids fabrication would result in an increase in substrate coverage, and consequently a decrease in transparency. Indeed, a gradual decrease in transparency of the grids in the visible spectra range from about 85% to about 55% with an increase in metal loading from 10 wt % to 30 wt % was observed (FIG. 5).

Optimal correlation between transparency and conductivity was found for grids prepared with dispersions containing 14% silver. This dispersion allowed fabrication of transparent grid electrodes using only a small amount of high cost silver. The electrodes obtained were used for further electrochromic coatings.

Figure 6:
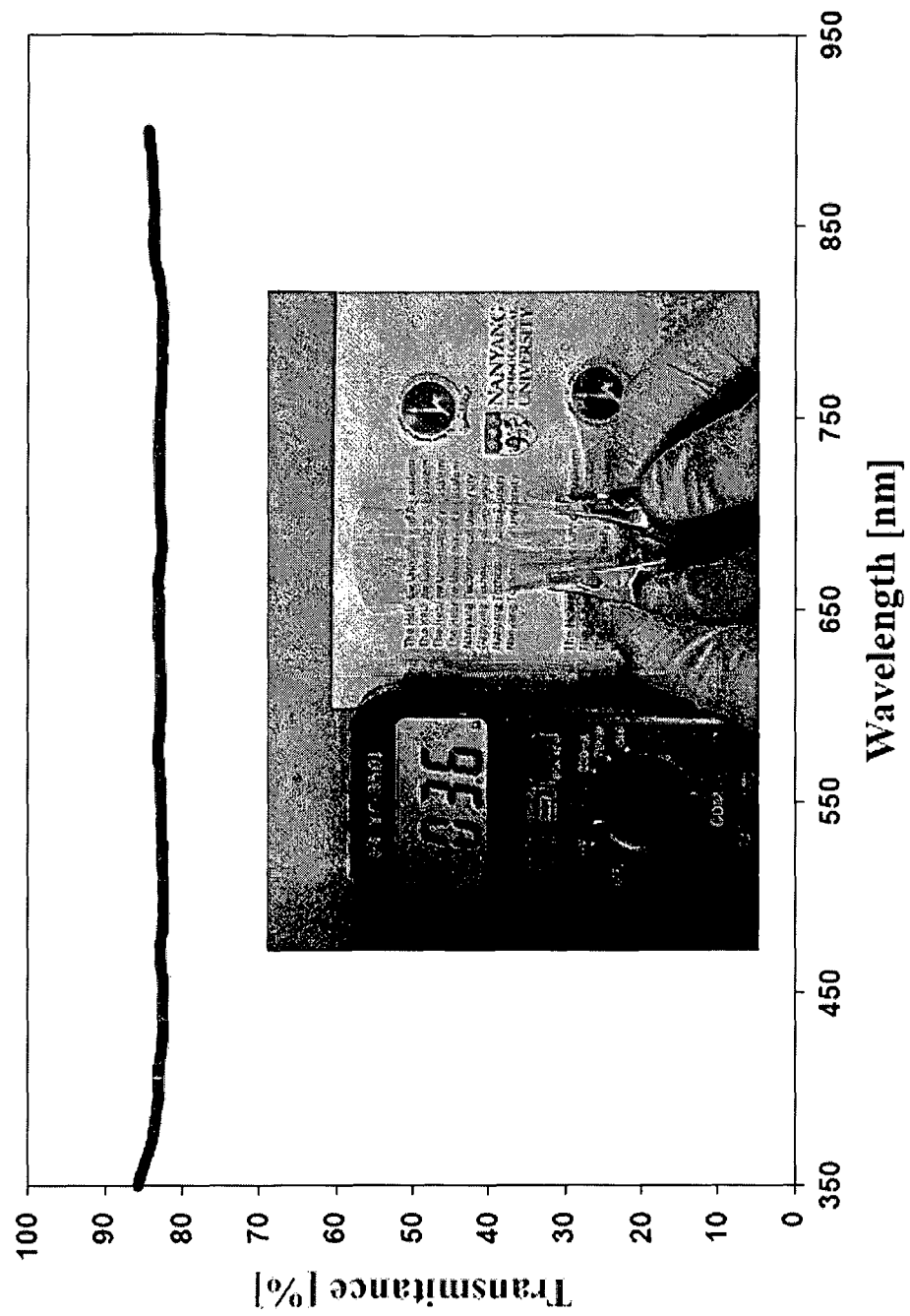
FIG. 6 shows transparency of silver grids fabricated with the use of 14 wt % dispersion of Ag nanoparticles (PET as a reference). Ohmmeter shows the sheet resistance of the grid during bending.

As seen in FIG. 6, such electrodes may be characterized by a fairly uniform transmittance (82±3%) in the spectra range of 350 nm to 900 nm (PET as a reference), and low sheet resistance (typically $1\Omega/\square$ to $5\Omega/\square$). For comparison, commercially available ITO-based flexible electrodes have higher sheet resistance, in the range of 15 to $100\text{-}200\Omega/\square$, transparency of about 80%.

An important feature of the electrode is also the stable conductivity under repeated bending. The inherent brittleness of ITO films severely limits their application. For example, sheet resistance of ITO films deposited on PET was found to increase 500 times upon 13 bending cycles.

A comparison was made with the silver grid electrodes disclosed herein. It was found that the silver grid electrodes were very stable under bending. For example, 50 and 100 cycles of bending resulted only in a slight increase in resistance from $6\Omega/\square$ to $9\Omega/\square$, and from $2\Omega/\square$ to $5\Omega/\square$, respectively.

Figure 7:
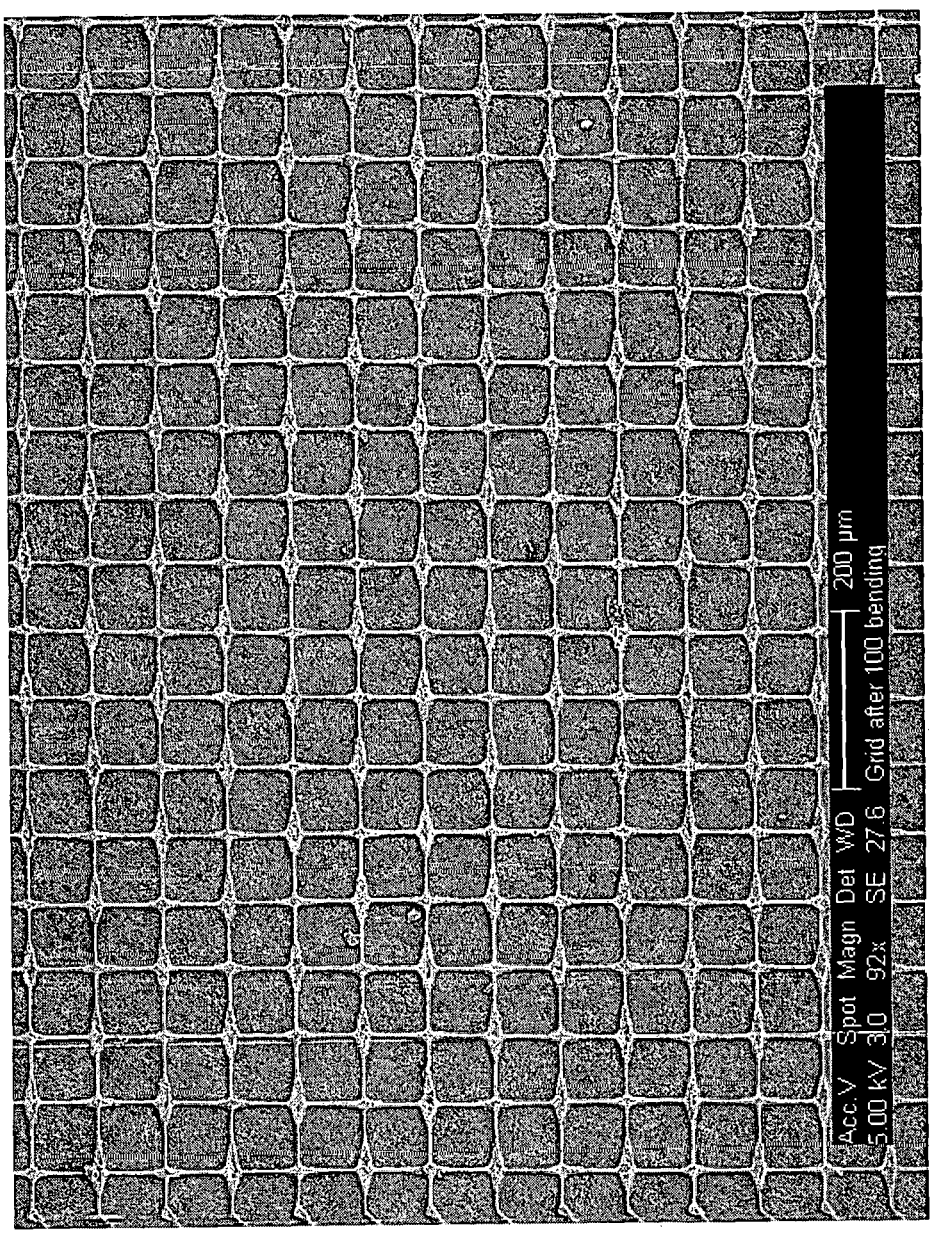
FIG. 7 is a SEM image of Ag grid after 100 cycles of bending. Scale bar in the figure represents 200 μm.

As shown in FIG. 7, 100 cycles of bending did not cause visible changes in the grid morphology. The high stability to bending may have resulted from chemical sintering carried out during grid fabrication, which caused the silver particles to coalesce, and at the same time, induced porosity within the grid lines.

Example 2.3

Electrochromic Tests

Figure 8:
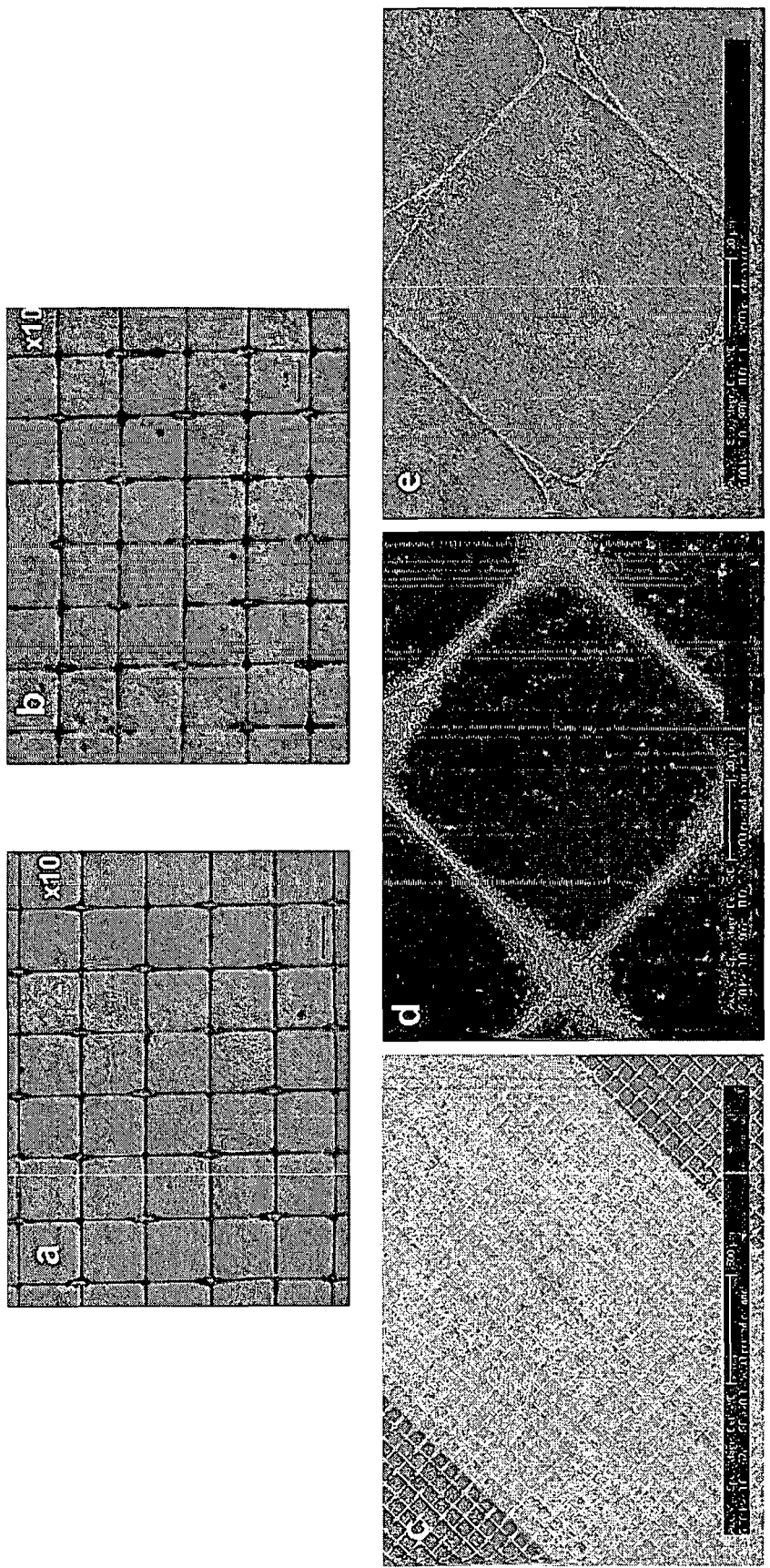

For evaluation of electrochromic performance, 5 wt % $WO_3$ ink was printed onto the silver grid plastic electrode. As may be seen from the optical (FIGS. 8A and 8B) and SEM images (FIGS. 8D, 8E and 8C), after printing the $WO_3$ ink, the electrode retains its original structure.

Figure 9:
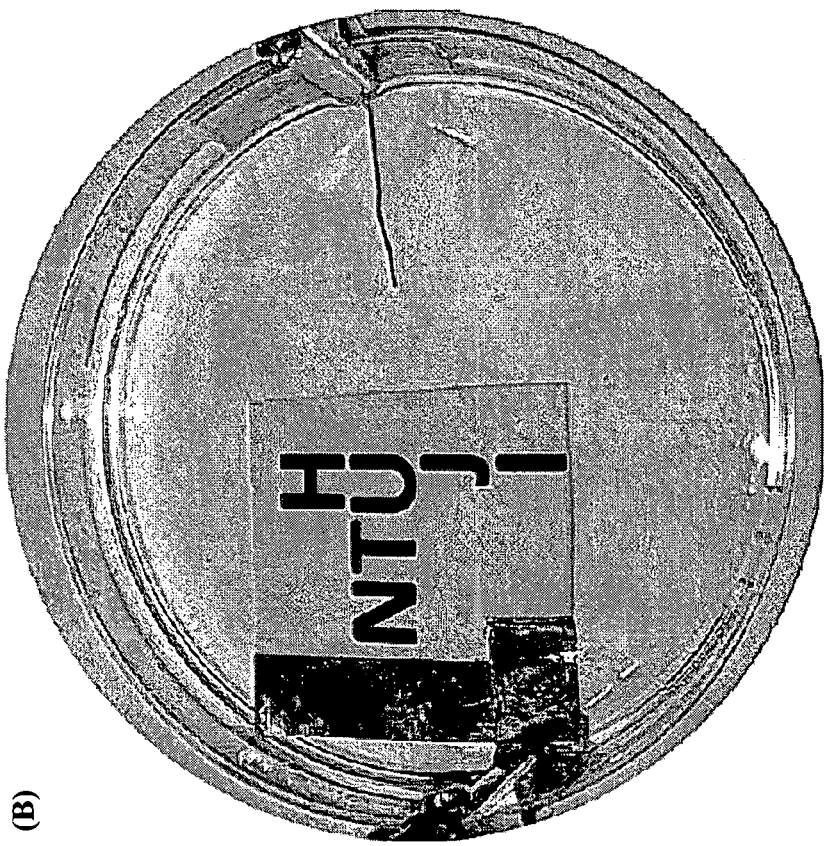
FIGS. 9A and B show electrochromic cell with a transparent Ag grid electrode and Pt counter-electrode dipped into $LiClO_4$/PC electrolyte, where (A) printed image before applying electric field, and (B) printed pattern 15 sec after applying the negative potential.
Figure 9:
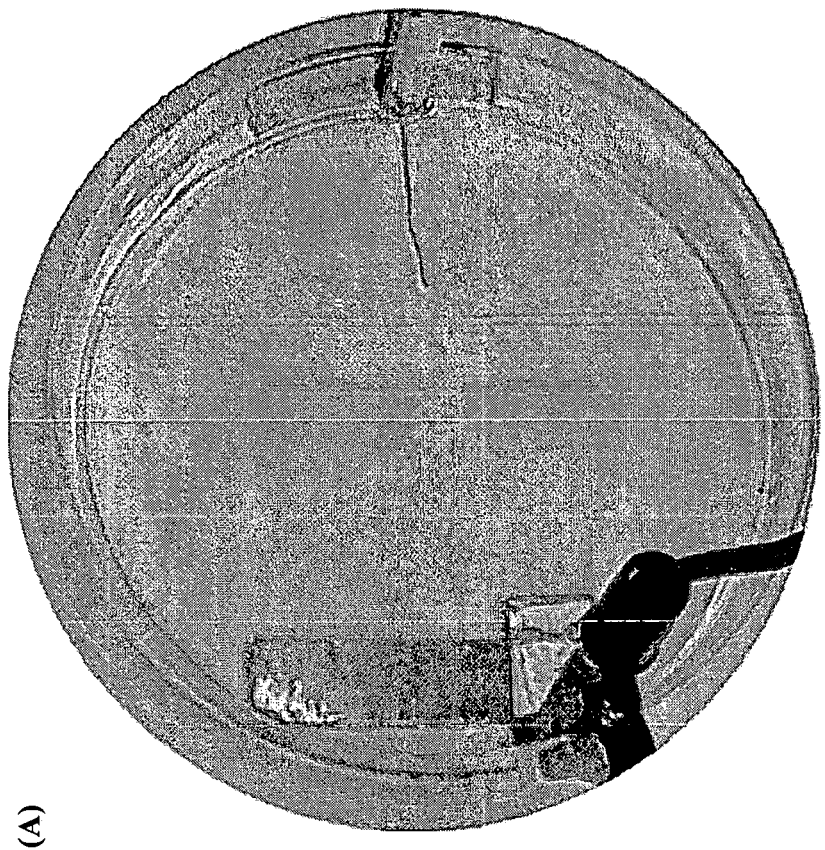

In general, it was found that combining the silver grid with inkjet printing of $WO_3$ nanoparticles enabled fabrication of electrochromic films with controllable contrast value. FIG. 9 shows results of qualitative electrochromic test with use of silver grid as a transparent working electrode, on which five layers of concentrated $WO_3$ inks (5 wt %), were printed, and using Pt wire as a counter-electrode. These electrodes were dipped into $LiClO_4/PC$ electrolyte. After a negative potential was applied to the working electrode, immediate coloration was observed, which gave deep and uniform blue patterning after about 15 sec.

The same effect was observed using Ag grid on PET instead of Pt wire as a counter-electrode. Switching off the electric field led to a slow decoloration, with return of weak yellow color of the printed pattern after about 20 minutes. An important result is that decoloration was also achieved by changing polarization of silver grid electrodes (at least for 10 cycles).

To evaluate performance of the electrochromic films, the transmittance spectra, cycling efficiency, and contrast as a function of thickness of the electrochromic layer were measured.

Figure 10:
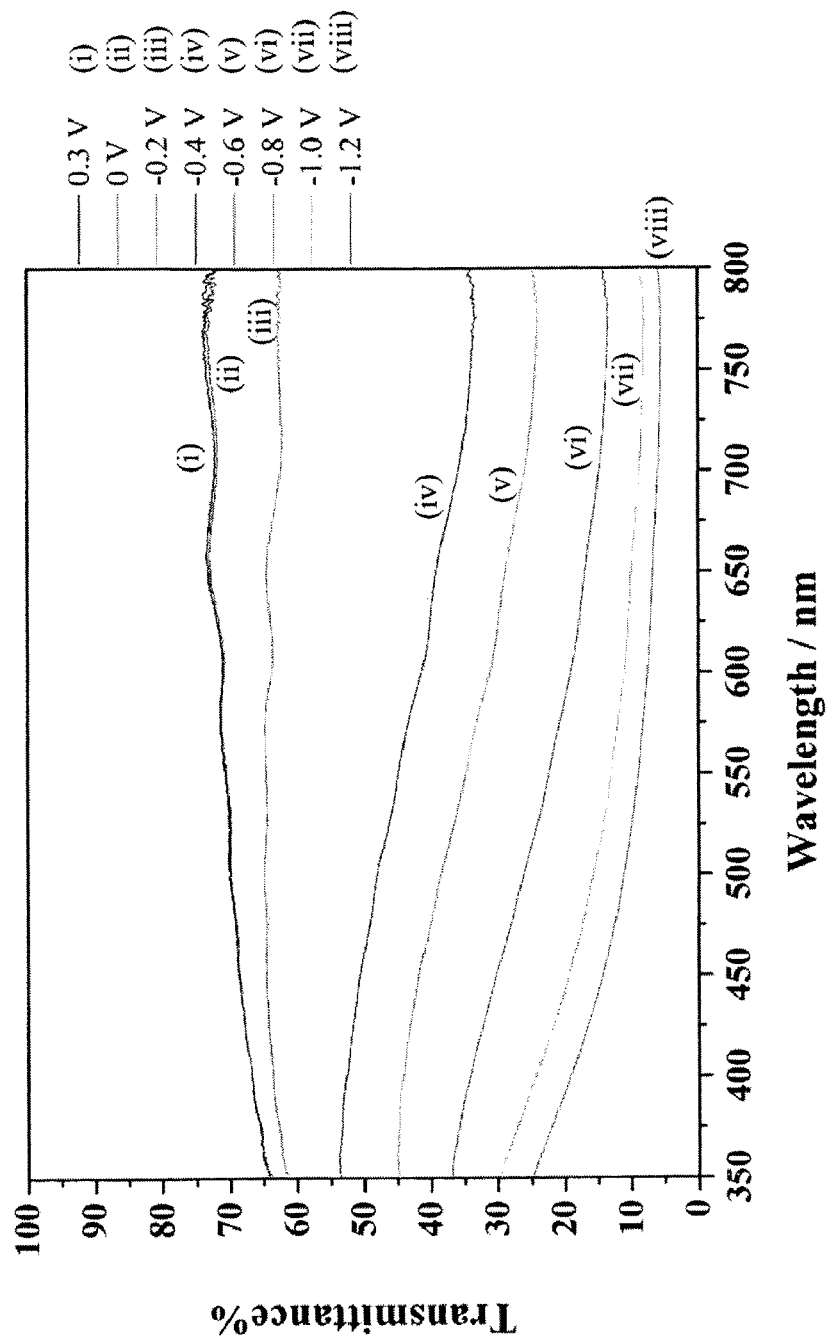
FIG. 10 is a graph showing transmittance of electrochromic films with 3 printed $WO_3$ layers (5 wt % ink) as a function of applied potential of (i) 0.3 V, (ii) 0 V, (iii) −0.2 V, (iv) −0.4 V, (v) −0.6 V, (vi) −0.8 V, (vii) −1.0 V, and (viii) −1.2 V.

The transmittance spectra of the electrochromic films were measured with respect to the applied potential (FIG. 10). From these results, it is clear that the contrast gradually increased as the applied potential went negative. The highest contrast (about 60%) was observed with an applied potential value of −1.2 V.

Figure 11:
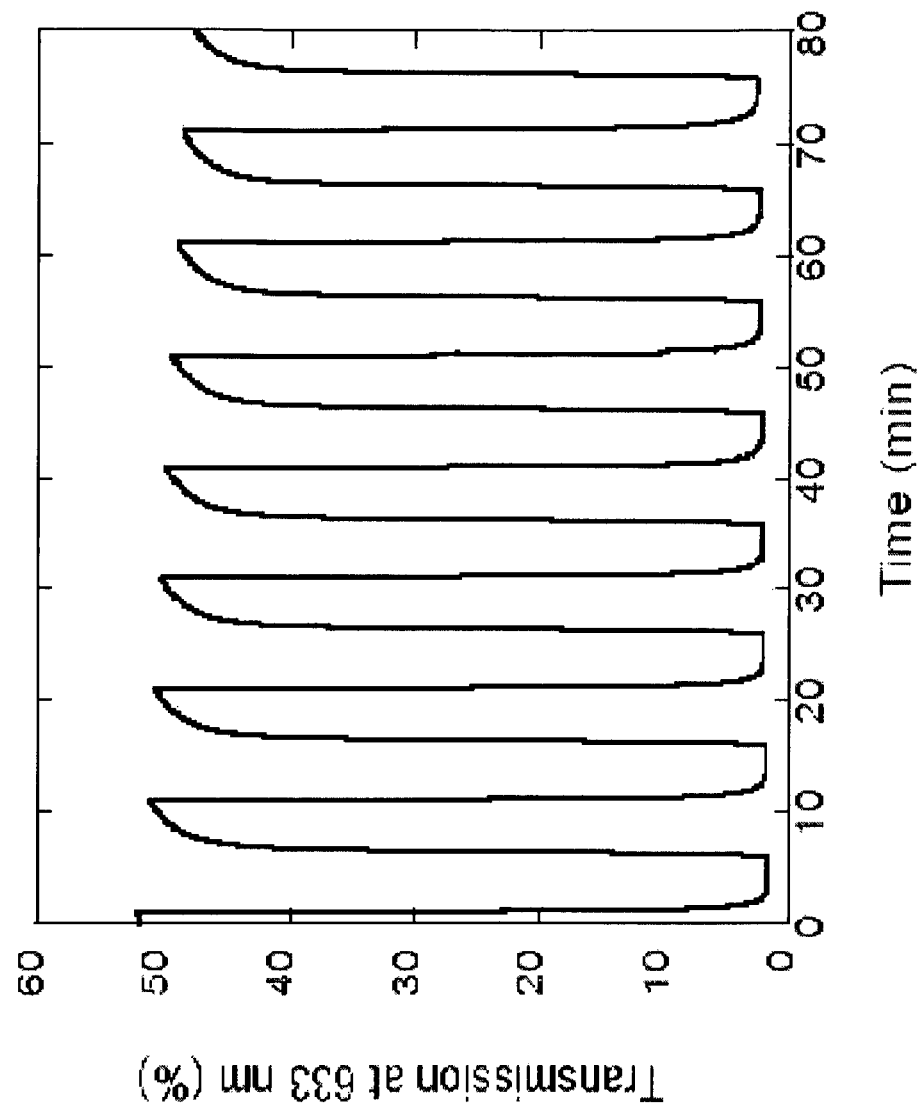
FIG. 11 is a graph showing cycling measurements of electrochromic film at 633 nm (3 printed layers of $WO_3$ (5%)).

FIG. 11 shows cycling transmission measurements of an electrochromic device at 633 nm and applied voltage −1.2/+1.2 V. As may be seen from the figure, first cycles were characterized by contrast of about 50% with slow decrease after 8 cycles. Coloration efficiency, which is defined as the change in optical density per unit of inserted charge, was found to be 26.19 $C^{-1}$ for 3 printed layers of 5% $WO_3$.

Figure 12:
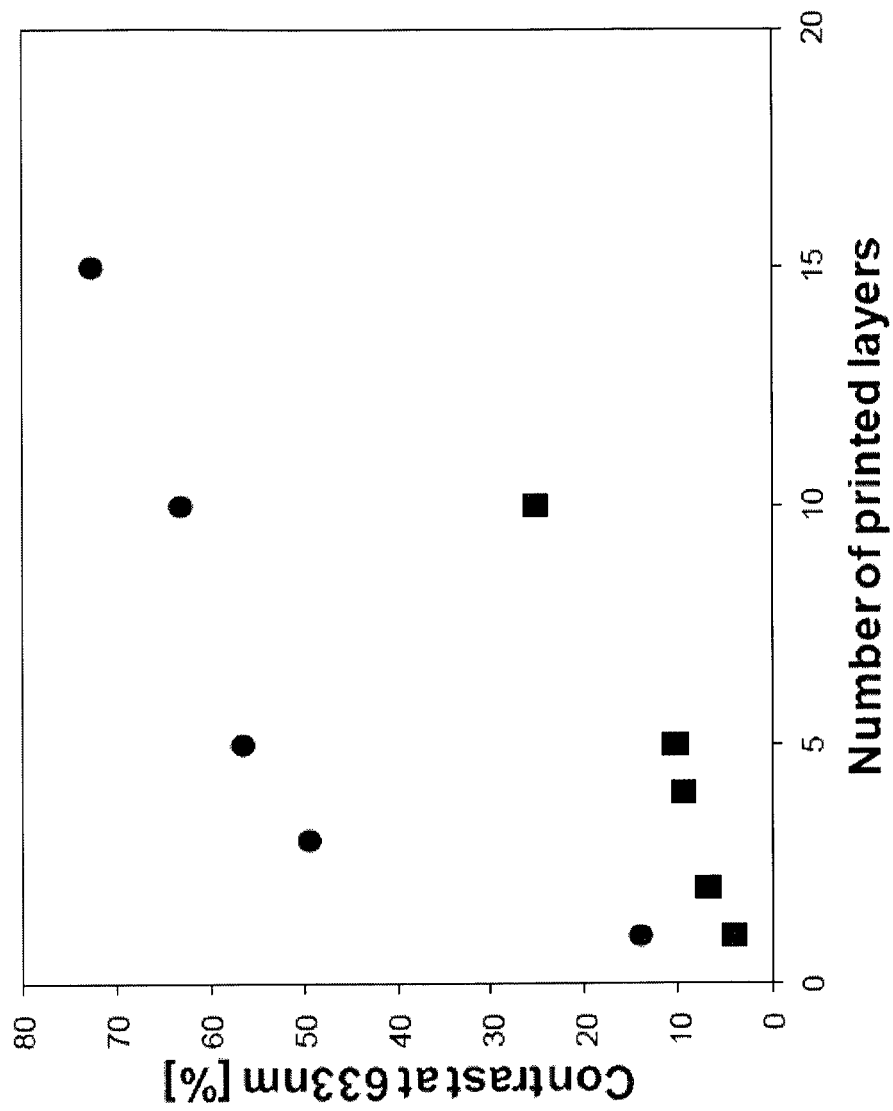
FIG. 12 is a graph showing contrast as a function of the number of printed $WO_3$ layers on PET substrate of 0.5 wt % ink and 5 wt % ink.
Figure 13:
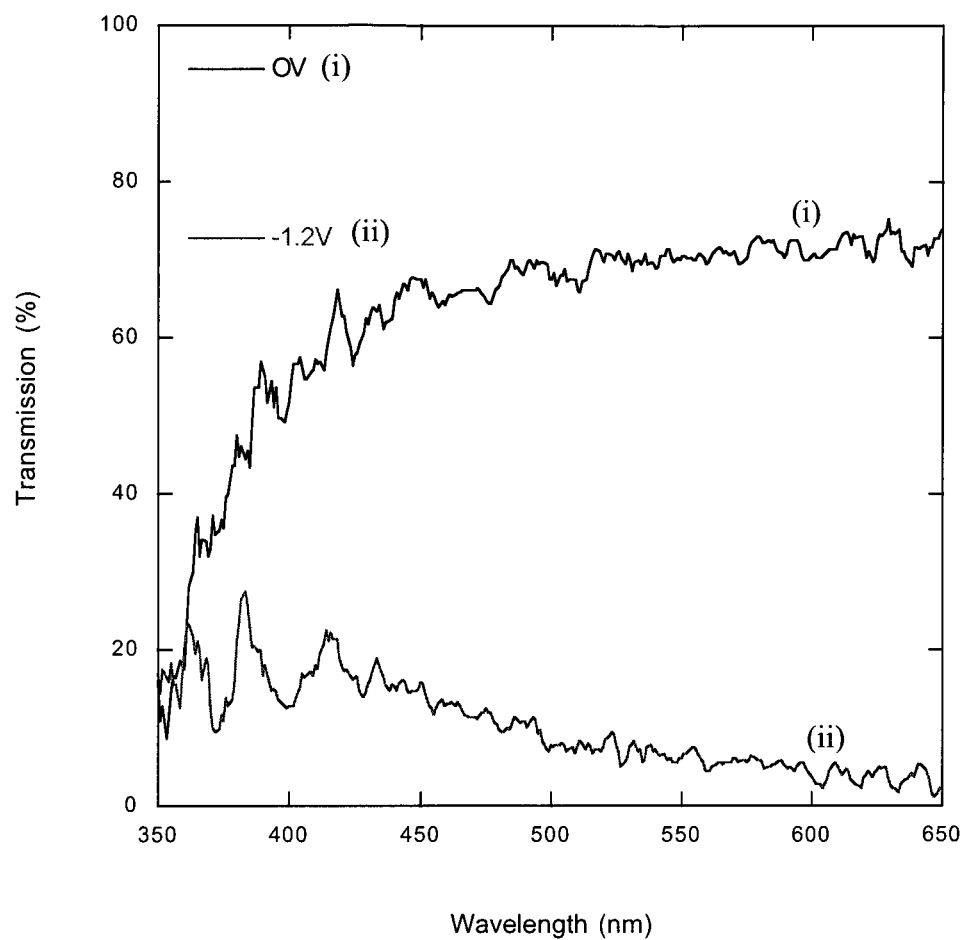
FIG. 13 is a graph showing UV-visible light transmission spectra for 15 printed $WO_3$ layers showing about 72% contrast at wavelength of 633 nm.

Thickness of the electrochromic film was increased by increasing number of printed $WO_3$ layers. The transmittance at 623 nm was measured before and after coloration caused by applying potential of −1.2 V (vs. Ag):

As shown in FIG. 12, increasing the number of printed $WO_3$ layers resulted in a gradual increase in film contrast. The contrast achieved with the use of 5 wt % $WO_3$ is much higher compared to that with 0.5 wt % dispersion, with values of 63% and 25%, respectively, for 10 printed layers. The contrast obtained for 15 layers printed with use of 5 wt % ink was found to be even higher at about 72%.

It is noted that the 10% difference in contrast for 3 printed layers, as follows from FIG. 10 (63%) and FIGS. 11 and 12 (about 50%) may be explained by bleaching that was performed prior to the analysis while measuring cycling and contrast as a function of number of printed layers.

Figure 14:
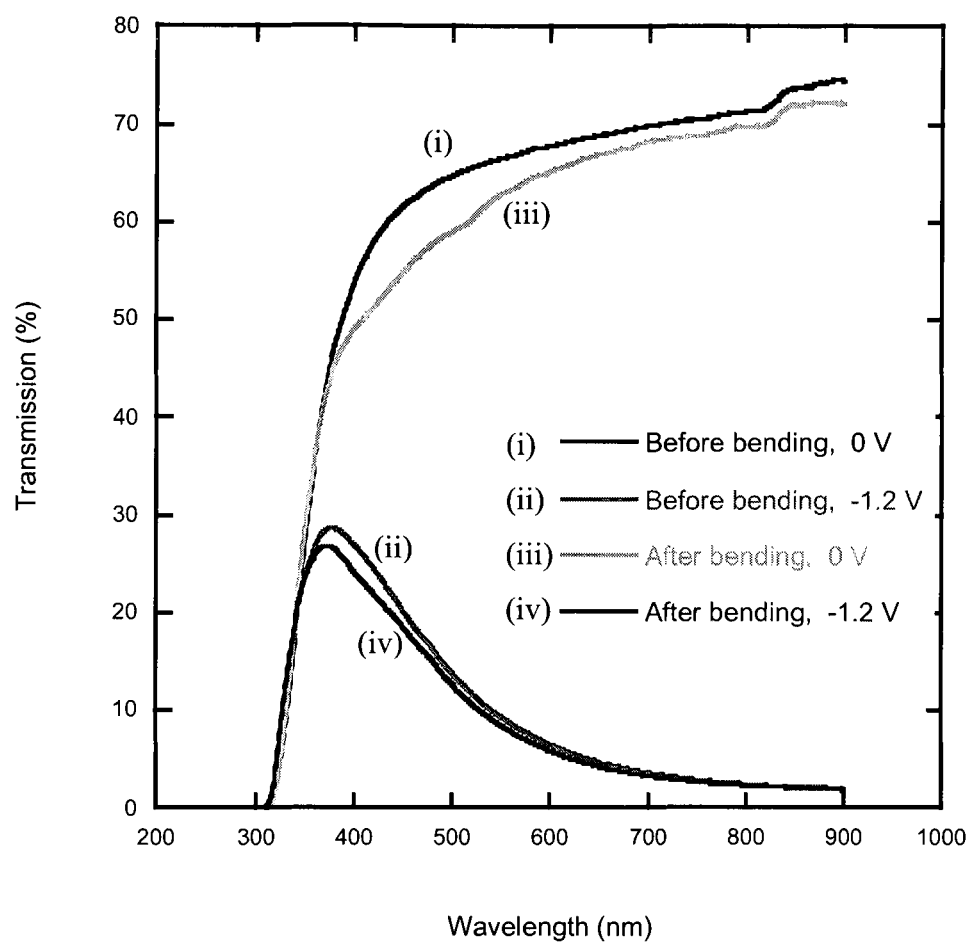
FIG. 14 is a graph showing UV-visible light transmission spectra for one printed $WO_3$ layer (750 dpi, 5 wt % $WO_3$ ink) before and after bending for 10 times in the electrolyte.

FIG. 14 shows an example of transmittance spectra that is measured for samples tested before and after bending for 10 times in $LiClO_4$ in PC electrolyte is shown in FIG. 6. It can be observed that there is minimal degradation occurred before and after bending across all wavelength from 350 nm to 900 nm.

Figure 15:
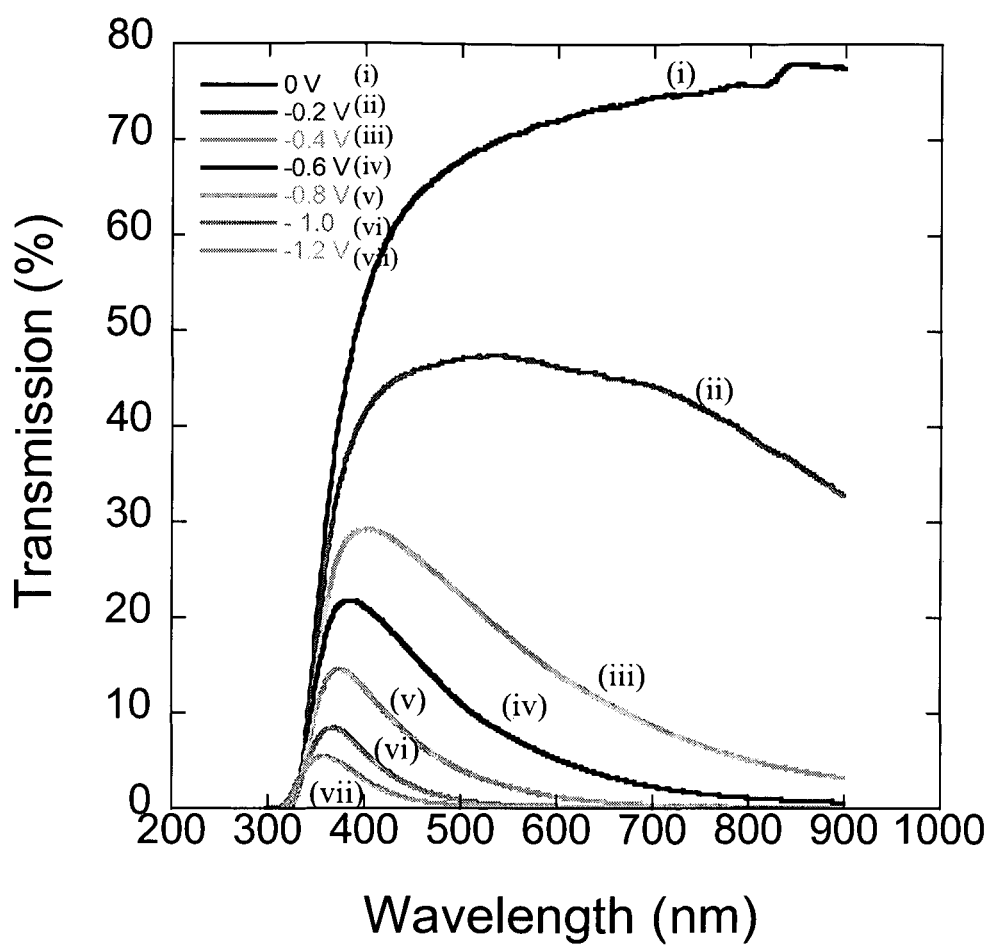
FIG. 15 is a graph showing UV-visible light transmission spectra for five printed $WO_3$ layers (750 dpi, 5 wt % $WO_3$ ink) at (i) 0 V, (ii) −0.2 V, (iii) −0.4 V, (iv) −0.6 V, (v) −0.8 V, (vi) −1.0 V, and (vii) −1.2 V.
Figure 16:
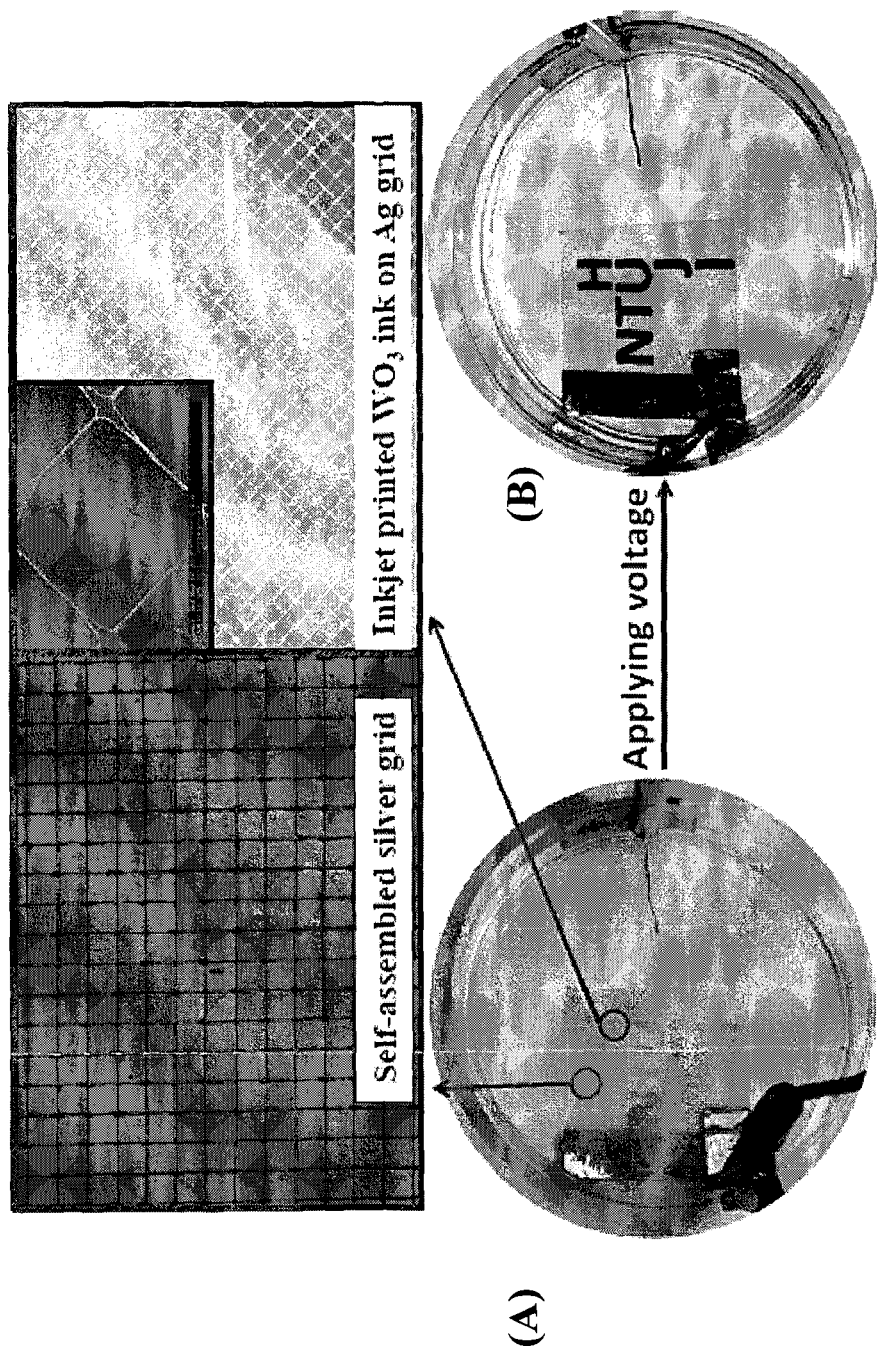
FIG. 16 shows photographs of an electrochromic cell with a transparent Ag grid electrode and Pt counter-electrode dipped into $LiClO_4$/PC electrolyte, where (A) printed image before applying electric field, and (B) printed pattern 15 sec after applying the negative potential, with expanded view of the self-assembled silver grid and inkjet printed $WO_3$ ink on Ag grid.

The desired transmittance may be tuned by controlling resolution of the printed material (dpi), as well as the number of printed layers of the EC-active material onto the TCE. In the UV-Visible light transmission spectra shown in FIG. 15, it can be observed that having a transmission spectra less than 1% is possible with 5 printed layers at 750 dpi with 5 wt % $WO_3$ ink at 633 nm wavelength.

Example 2.4

Viscosity Measurement

DOWANOL DB is used to tune viscosity of the $WO_3$ ink to make it suitable for inkjet printing. Using water and DOWANOL DB, a much higher wt % of $WO_3$, which in this case is 5 wt %, may be loaded in the ink, yet the viscosity of the 5 wt % $WO_3$ ink increases substantially. Hence, an unexpected result of higher loading of $WO_3$ in the ink at a viscosity suitable for inkjet printing is obtained. Moreover, a more compact $WO_3$ nanoparticle film is also obtained and this leads to a higher contrast. DOWANOL DB also prevents the fast drying of printed $WO_3$ nanoparticle film, which then facilitates certain degree of binding interactions such that additional printed film layers may be formed on the initial printed film layer.

For comparison purposes, TABLE 2 summarizes viscosity (cP) values of various solvents and $WO_3$ ink compositions.

TABLE 2

Viscosity measurement of various $WO_3$ ink combinations.

| Solvent | Viscosity (cP) |
| --- | --- |
| 5 wt. % $WO_3$ in DI Water | 1.51 |
| 5 wt. % $WO_3$ in DI Water + Ethanol (1:1) | 3.81 |
| 5 wt. % $WO_3$ in DI Water + IPA (1:1) | 8.50 |
| 5 wt. % $WO_3$ in DI Water + Dowanol DB (1:1) | 17.22 |

As demonstrated herein, patterned electrochromic (EC) devices including flexible films were obtained by combining self assembly and inkjet printing. Concentrated dispersions of active EC material such as $WO_3$ nanoparticles were inkjet printed on non-ITO transparent electrodes, which are composed of nanomaterials.

In case of grid patterns, the nanomaterials were composed of silver nanoparticles which self-assemble into uniform squares with line width of 3 μm to 4 μm. This metal grid, which was used for the first time in electrochromic applications, may be characterized by high transparency of about 80% to 90% in the spectral range of 400 nm to 800 nm, and have a low sheet resistance of below 100Ω/□, and is stable to multiple bending if printed on flexible substrate.

The printed patterned and nanostructured electrochromic films maintain their coloring and bleaching performance during bending of the flexible films, upon applying alternating potential. A high contrast of 72% at 633 nm was achieved.

Various embodiments describe a new method of making electrochromic devices by combining printing and non-ITO transparent conductors, and the resulting electrochromic devices that may be used in various applications such as smart windows and displays. The non-ITO transparent conductor is made of conductive material arranged in patterned features that have a surface coverage below 15%. The EC devices may be made by printing on rigid substrates such as glass and polycarbonate, or on flexible substrates such as, but not limited to, polyethylene terephthalate (PET), polyethylene naphthalate (PEN), polyimide and PDMS.

The printing of the EC active materials may be conducted by a variety of printing methodologies, preferably by inkjet printing. The resulting EC devices and films may be used for a variety of applications such as smart windows and displays.

While the present invention has been particularly shown and described with reference to exemplary embodiments thereof, it will be understood by those of ordinary skill in the art that various changes in form and details may be made therein without departing from the spirit and scope of the present invention as defined by the following claims.

The invention claimed is:

1. A method of manufacturing an electrochromic device, the method comprising
  a) providing a transparent electrode, wherein the transparent electrode is formed of lines of an electrically conductive material surrounding one or more of two-dimensional voids of various shapes, wherein the electrically conductive material is free of ITO and wherein the one or more of two-dimensional voids of various shapes do not contain an electrically conductive material, wherein one or more layers of an electrochromic material is applied to the transparent electrode, wherein at least a portion of the electrochromic material is in direct contact with the lines of the electrically conductive material of the transparent electrode, and wherein the lines of the electrically conductive material of the transparent electrode overlap with about 5% to about 15% by area of the electrochromic material;
b) providing a counter-electrode; and
c) providing an electrolyte, wherein the electrolyte is arranged to ionically connect the transparent electrode comprising the at least a portion of the electrochromic material in direct contact with the lines of the electrically conductive material and the counter-electrode.

2. The method according to claim 1, wherein providing the transparent electrode comprises chemically sintering the lines of the electrically conductive material of the transparent electrode.

3. The method according to claim 1, wherein the lines of the electrically conductive material are arranged to form a grid pattern.

4. The method according to claim 1, wherein the transparent electrode formed of the lines of the electrically conductive material surrounding one or more of two-dimensional voids of various shapes is formed directly on the one or more layers of the electrochromic material.

5. The method according to claim 1, wherein the one or more layers of the electrochromic material is applied in a second patterned arrangement to the transparent electrode.

6. The method according to claim 1, further comprising applying a second patterned arrangement of an electrically conductive material which is free of ITO as a second transparent electrode on the one or more layers of the electrochromic material.

7. The method according to claim 1, wherein applying the one or more layers of the electrochromic material to the transparent electrode comprises applying an electrochromic ink composition comprising
a) about 0.05 wt % to about 60 wt % of the electrochromic material;
b) about 40 wt % to about 95 wt % of a liquid vehicle;
c) about 0.01 wt % to about 20 wt % of a physicochemical modifier; and
d) about 0.01 wt % to about 20 wt % of an additive;
wherein respective wt % are calculated based on total weight of the composition and sum of the respective wt % is 100 wt %, to the transparent electrode.

8. The method according to claim 7, wherein the liquid vehicle is selected from the group consisting of ethylene glycol, diethylene glycol, diethylene glycol n-butyl ether, diethylene glycol n-butyl ether acetate, diethylene glycol ethyl ether, diethylene glycol ethyl ether acetate, diethylene glycol methyl ether, dipropylene glycol butyl ether, dipropylene glycol methyl ether, dipropylene glycol methyl ether acetate, ethylene glycol dibutyrate, and combinations thereof.

9. The method according to claim 7, wherein the liquid vehicle further comprises a liquid selected from the group consisting of an aqueous solution, water, ethanol, isopropyl alcohol, ethylene glycol, propylene glycol, n methyl pyrrolidone, terpinol, dipropylene glycol methyl ether (DPM), dipropylene glycol methyl ether acetate (DPMA), and combinations thereof.

10. The method according to claim 7, wherein the physicochemical modifier is selected from the group consisting of a surfactant, a polymer, a co-solvent, a viscosity modifier, a surface tension modifier, an evaporation rate control agent, and combinations thereof.

11. The method according to claim 7, wherein the additive is selected from the group consisting of a binder, a pH control agent, an antimicrobial agent, and combinations thereof.

12. A method of manufacturing an electrochromic device, the method comprising
a) providing a transparent electrode, wherein the transparent electrode is formed of lines of an electrically conductive material surrounding one or more of two-dimensional voids of various shapes, wherein the electrically conductive material is free of ITO and wherein the one or more of two-dimensional voids of various shapes do not contain an electrically conductive material, wherein providing the transparent electrode comprises applying a dispersion comprising the electrically conductive material to a template arranged on a substrate, and forming the lines of the electrically conductive material on the substrate by self-assembly,
wherein one or more layers of an electrochromic material is applied to the transparent electrode, wherein at least a portion of the electrochromic material is in direct contact with the lines of the electrically conductive material of the transparent electrode, and wherein the lines of the electrically conductive material of the transparent electrode overlap with about 5% to about 15% by area of the electrochromic material;
b) providing a counter-electrode; and
c) providing an electrolyte, wherein the electrolyte is arranged to ionically connect the transparent electrode comprising the at least a portion of the electrochromic material in direct contact with the lines of the electrically conductive material and the counter-electrode.

13. An electrochromic device comprising
a) a transparent electrode formed of (i) lines of an electrically conductive material surrounding one or more of two-dimensional voids of various shapes, wherein the electrically conductive material is free of ITO and wherein the one or more of two-dimensional voids of various shapes do not contain an electrically conductive material, wherein the lines of the electrically conductive material are formed on a substrate by self-assembly of a dispersion comprising the electrically conductive material applied to a template arranged on the substrate, and (ii) one or more layers of an electrochromic material, wherein at least a portion of the electrochromic material is in direct contact with the lines of the electrically conductive material of the transparent electrode, and wherein the lines of the electrically conductive material of the transparent electrode overlap with about 5% to about 15% by area of the electrochromic material;
b) a counter-electrode; and
c) an electrolyte, wherein the electrolyte is arranged to ionically connect the transparent electrode comprising the at least a portion of the electrochromic material in direct contact with the lines of the electrically conductive material and the counter-electrode.

14. The electrochromic device according to claim 13, wherein the lines of the electrically conductive material are arranged to form a grid pattern.

15. The electrochromic device according to claim 13, wherein the one or more layers of the electrochromic material is in a second patterned arrangement.

16. The electrochromic device according to claim 13, further comprising a second patterned arrangement of an electrically conductive material which is free of ITO as a second transparent electrode and arranged in electrical contact with the one or more layers of an electrochromic material.

* * * * *